US010103988B2

(12) United States Patent
Tan

(10) Patent No.: US 10,103,988 B2
(45) Date of Patent: Oct. 16, 2018

(54) SWITCHING DEVICE, CONTROLLER, METHOD FOR CONFIGURING SWITCHING DEVICE, AND METHOD AND SYSTEM FOR PROCESSING PACKET

(71) Applicant: Huawei Technologies Co., Ltd., Shenzhen, Guangdong (CN)

(72) Inventor: Shiyong Tan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 14/997,873

(22) Filed: Jan. 18, 2016

(65) Prior Publication Data
US 2016/0134534 A1    May 12, 2016

Related U.S. Application Data

(63) Continuation of application No. PCT/CN2013/079678, filed on Jul. 19, 2013.

(51) Int. Cl.
*H04L 12/741* (2013.01)
*H04L 12/751* (2013.01)
*H04L 12/24* (2006.01)

(52) U.S. Cl.
CPC ........ *H04L 45/745* (2013.01); *H04L 41/0803* (2013.01); *H04L 45/02* (2013.01)

(58) Field of Classification Search
None
See application file for complete search history.

(56) References Cited

U.S. PATENT DOCUMENTS

| 2005/0005023 | A1* | 1/2005 | Dobbins ............ H04L 45/02 709/238 |
| 2009/0274154 | A1 | 11/2009 | Kopelman et al. |
| 2011/0188373 | A1 | 8/2011 | Saito |
| 2011/0261825 | A1* | 10/2011 | Ichino ............ H04L 45/38 370/400 |
| 2011/0307628 | A1* | 12/2011 | Chiba ............ H04L 49/355 709/241 |

(Continued)

FOREIGN PATENT DOCUMENTS

| CN | 102349268 A | 2/2012 |
| CN | 102739549 A | 10/2012 |

(Continued)

OTHER PUBLICATIONS

"OpenFlow Switch Specification", Version 1.3.0 (Wire Protocol 0x04), Jun. 25, 2012, 106 pages.

*Primary Examiner* — Bunjob Jaroenchonwanit

(57) ABSTRACT

Embodiments of the present invention provide a method for configuring a switching device, wherein the method includes: setting a first flow entry in at least one flow table, where the first flow entry includes a match field, the match field is used for designating information that needs to be matched, and instructing the switching device to perform matching between a value of information that is of a received packet and needs to be matched and a first field of each record in a database, to obtain a first record matching the packet, where each record in the database includes the first field, and the first field is used for denoting a designated value of the information that needs to be matched. The present invention reduces a quantity of flow entries.

11 Claims, 9 Drawing Sheets

(56) References Cited

U.S. PATENT DOCUMENTS

| | | | |
|---|---|---|---|
| 2011/0317559 A1* | 12/2011 | Kern | H04L 45/02 |
| | | | 370/235 |
| 2011/0317701 A1* | 12/2011 | Yamato | H04L 45/04 |
| | | | 370/392 |
| 2012/0113989 A1* | 5/2012 | Akiyoshi | H04L 45/02 |
| | | | 370/392 |
| 2013/0223452 A1* | 8/2013 | Shimonishi | H04L 49/3009 |
| | | | 370/392 |
| 2014/0204796 A1* | 7/2014 | Bantukul | H04L 65/1069 |
| | | | 370/254 |
| 2014/0241356 A1* | 8/2014 | Zhang | H04L 45/38 |
| | | | 370/392 |
| 2014/0269299 A1* | 9/2014 | Koornstra | H04L 41/0816 |
| | | | 370/235 |
| 2015/0016450 A1* | 1/2015 | Suemitsu | H04L 45/38 |
| | | | 370/389 |
| 2015/0200850 A1 | 7/2015 | Akiyoshi | |
| 2015/0263953 A1* | 9/2015 | Sasaki | H04L 63/102 |
| | | | 370/392 |
| 2016/0242097 A1* | 8/2016 | Dinan | H04L 45/50 |

FOREIGN PATENT DOCUMENTS

| | | |
|---|---|---|
| CN | 102857416 A | 1/2013 |
| CN | 103209121 A | 7/2013 |
| JP | 2011160171 A | 8/2011 |
| JP | 2012175394 A | 9/2012 |
| KR | 20120115359 A | 10/2012 |
| WO | WO 2012/060403 A1 | 5/2012 |

\* cited by examiner

SWITCHING DEVICE, CONTROLLER, METHOD FOR CONFIGURING SWITCHING DEVICE, AND METHOD AND SYSTEM FOR PROCESSING PACKET

CROSS REFERENCE TO RELATED APPLICATIONS

This invention is a continuation of International Application No. PCT/CN2013/079678, filed on Jul. 19, 2013, which is hereby incorporated by reference in its entirety.

TECHNICAL FIELD

The present invention relates to the field of communications, and in particular, to a switching device, a controller, a method for configuring a switching device, and a method and system for processing a packet.

BACKGROUND

OpenFlow is a control protocol between an OpenFlow controller (controller for short) and an OpenFlow switching device (switch for short). The controller controls behaviors of the switch mainly by using a flow table. The flow table is stored in the switch, and formed by several flow entries. Each flow entry generally includes match fields and instructions. A match field generally designates information that needs to be matched (which may be information such as various packet header fields or an ID of a port from which the switch receives a packet), and provides a designated value of the information that needs to be matched, where the designated value is used for comparison with an actual value of the information that is of the packet and needs to be matched, and the instructions include multiple types of instructions, which include an action used for instructing to perform an operation on the packet.

After receiving the packet, the switch performs matching between the received packet and a match field of each flow entry in a flow table that needs to be matched (that is, compares the actual value of the information that is of the packet and needs to be matched with a designated value of the match field of each flow entry in the flow table that needs to be matched to determine whether they are the same). If matching between the received packet and a match field of a flow entry is successful (that is, content of the match field of the flow entry is the same as the actual value of the information that is of the packet and needs to be matched), the switch processes the packet according to an instruction in the flow entry for which matching is successful; if matching between the received packet and match fields of all other flow entries in the flow table that needs to be matched fails, and a Table-Miss flow entry (the Table-Miss flow entry is a special flow entry in the OpenFlow flow table, and this flow entry has no match field, that is, matching between this flow entry and all packets can succeed, and this flow entry has a lowest matching priority) exists in the flow table, the switch processes the packet according to the Table-Miss flow entry (for example, the packet may be discarded or sent to the controller for processing), and if there is no Table-Miss flow entry, the switch determines, according to attributes of the flow table, how to process the packet (for example, the packet may be configured to be discarded or sent to the controller for processing). According to the Table-Miss flow entry or the attributes of the flow table, if the packet needs to be sent to the controller, a first OpenFlow message (the first OpenFlow message includes all or some content of the packet on which matching fails) used for indicating that matching fails is sent to the controller. If the controller receives the first OpenFlow message, the controller may deliver a flow entry to the switch by using a second OpenFlow message, so as to instruct the switch to establish a new flow entry in the flow table that needs to be matched, and a designated value that is of information that needs to be matched and is in a match field of the new flow entry matches the actual value of the information that is of the packet and needs to be matched. After establishing the flow entry in the flow table that needs to be matched, the switch may perform matching on the packet again. Independent of the packet reported by the switch, the controller may also directly deliver a third OpenFlow message, so as to instruct the switch to establish a new flow entry in the flow table that needs to be matched.

To reduce OpenFlow messages between a switch and a controller, the prior art provides a switch configuration method, where the method includes: First, a synchronization flow table and a synchronization rule are configured for a designated flow table in a switch, where the synchronization rule is used for converting a flow entry in the designated flow table into a flow entry in the synchronization flow table, thereby implementing synchronization of update operations such as flow entry addition, modification, and deletion between the two flow tables. Then, the switch receives a second or third OpenFlow message delivered by a controller, and adds, modifies, or deletes a flow entry in a flow table designated by the second or third OpenFlow message, and if the flow table designated by the second or third OpenFlow message has a synchronization flow table, the switch updates, in the synchronization flow table, a flow entry corresponding to the flow entry according to the synchronization rule.

The prior art has the following disadvantage: when a flow entry in a designated flow table is updated, a flow entry in a synchronization flow table also needs to be updated synchronously. If a synchronization update fails, the flow entry in the synchronization flow table is not updated, and therefore when matching is performed between a packet and the flow entry in the synchronization flow table, error packet matching is performed. Moreover, a switch needs to maintain a large quantity of flow entries, a large quantity of redundant information exists in flow entries of different flow tables, and system overhead increases as networking scale increases.

SUMMARY

To eliminate redundant information existing in flow entries of different flow tables, and reduce a quantity of the flow entries, embodiments of the present invention provide a switching device, a controller, a method for configuring a switching device, and a method and system for processing a packet. The technical solutions are as follows:

According to a first aspect, an embodiment of the present invention provides a method for configuring a switching device, where one or more flow tables are set in the switching device, and the method includes:

setting a first flow entry in at least one of the flow tables, where the first flow entry includes a match field; the match field is used for designating information that needs to be matched, and instructing the switching device to perform matching between a value of information that is of a received packet and needs to be matched and a first field of each record in a database; the information that needs to be matched includes one or more of a packet header field, an identity of an ingress port from which the switching device receives the packet, and metadata associated with the packet; and each record in the database includes the first field, and the first field is used for denoting a designated value of the information that needs to be matched.

According to a second aspect, an embodiment of the present invention provides a method for configuring a switching device, where the method includes:

sending a first flow entry installation message, where the first flow entry installation message includes a flow table identity and a first flow entry; the first flow entry installation message is used for instructing the switching device to set the first flow entry in a flow table corresponding to the flow table identity; the first flow entry includes a match field, and the match field is used for designating information that needs to be matched, and instructing the switching device to perform matching between information that is of a received packet and needs to be matched and a first field of each record in a database; the information that needs to be matched includes one or more of a packet header field, an identity of an ingress port from which the switching device receives the packet, and metadata associated with the packet; and each record in the database includes the first field, and the first field is used for denoting a designated value of the information that needs to be matched.

According to a third aspect, an embodiment of the present invention provides a method for processing a packet, where the method includes:

receiving a packet;

obtaining, according to a match field of a first flow entry in a flow table that the packet needs to match, a value of information that is of the packet and needs to be matched, where the first flow entry includes the match field and a packet processing instruction; the match field is used for designating information that needs to be matched; and the information that needs to be matched includes one or more of a packet header field, an identity of an ingress port from which the switching device receives the packet, and metadata associated with the packet;

performing, under an instruction of the match field, matching between the value of the information that is of the packet and needs to be matched and a first field of each record in a database, where the first field is used for denoting a designated value of the information that needs to be matched; and processing the packet according to the packet processing instruction when a first record matching the packet is obtained.

According to a fourth aspect, an embodiment of the present invention provides a switching device, where one or more flow tables are set in the switching device, and the device includes:

a first setting module, configured to set a first flow entry in at least one of the flow tables, where the first flow entry includes a match field; the match field is used for designating information that needs to be matched, and instructing the switching device to perform matching between a value of information that is of a received packet and needs to be matched and a first field of each record in a database; the information that needs to be matched includes one or more of a packet header field, an identity of an ingress port from which the switching device receives the packet, and metadata associated with the packet; and each record in the database includes the first field, and the first field is used for denoting a designated value of the information that needs to be matched.

According to a fifth aspect, an embodiment of the present invention provides a switching device, where one or more flow tables are set in the switching device, and the switching device includes a processor and a network interface, and the processor is configured to:

set a first flow entry in at least one of the flow tables, where the first flow entry includes a match field; the match field is used for designating information that needs to be matched, and instructing the switching device to perform matching between a value of information that is of a received packet and needs to be matched and a first field of each record in a database; the information that needs to be matched includes one or more of a packet header field, an identity of an ingress port from which the switching device receives the packet, and metadata associated with the packet; and each record in the database includes the first field, and the first field is used for denoting a designated value of the information that needs to be matched.

According to a sixth aspect, an embodiment of the present invention provides a controller, where the controller includes:

a first sending module, configured to send a first flow entry installation message, where the first flow entry installation message includes a flow table identity and a first flow entry; the first flow entry installation message is used for instructing the switching device to set the first flow entry in a flow table corresponding to the flow table identity; the first flow entry includes a match field, and the match field is used for designating information that needs to be matched, and instructing the switching device to perform matching between information that is of a received packet and needs to be matched and a first field of each record in a database; the information that needs to be matched includes one or more of a packet header field, an identity of an ingress port from which the switching device receives the packet, and metadata associated with the packet; and each record in the database includes the first field, and the first field is used for denoting a designated value of the information that needs to be matched.

In the embodiments of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodi

DETAILED DESCRIPTION

To make the objectives, technical solutions, and advantages of the present invention clearer, the following further describes the embodiments of the present invention in detail with reference to the accompanying drawings.

Embodiments of the present invention are applicable to a network architecture in which a control plane is separated from a forwarding plane, and in particular, applicable to an OpenFlow network architecture. The control plane may be deployed in a centralized manner, the forwarding plane may be deployed on multiple physical devices in a distributed manner according to actual needs, and the control plane controls the forwarding plane, and thereby may implement various network functions, such as routing and switching.

Figure 1:
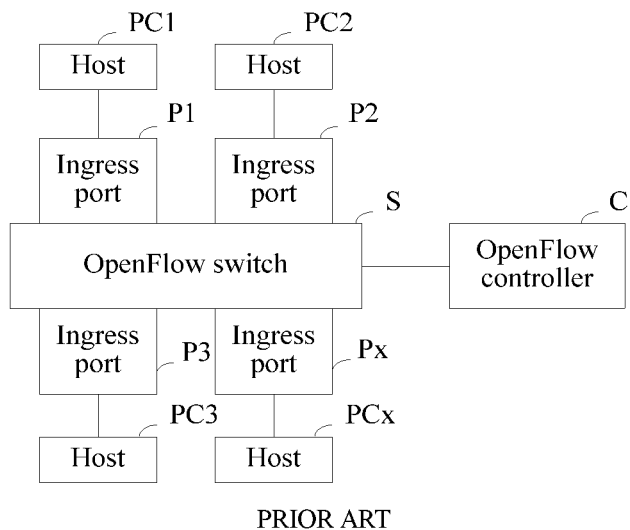
- FIG. 1 is a schematic diagram of a typical application scenario of an OpenFlow system according to an embodiment of the present invention.

For convenience of understanding the technical solutions provided in the embodiments of the present invention, by using an OpenFlow network architecture as an example below, a typical application scenario of the embodiments of the present invention is introduced, but the present invention is not limited thereto. In the OpenFlow network architecture, a network element of the control plane is referred to as an OpenFlow controller, and a network element of the forwarding plane is referred to as an OpenFlow switching device. Referring to FIG. 1, a switch S is connected to a controller C. The switch S communicates with the controller C by using signaling information that conforms to an OpenFlow protocol. The switch S has x ports that are separately marked as P1, P2, . . . , and Px, where x is a natural number and x≥2, each port may be connected to a host, and a host connected to the port Px may be marked as PCx. In the scenario shown in FIG. 1, the host PCx is directly connected to the port Px of the switch S, and in another application scenario of the embodiments of the present invention, the switch S may also be separately connected to the controller C and a host by using another switch. The embodiments of the present invention do not limit a manner in which the switch S is separately connected to the controller C and the host PCx.

The switch S may store one or more flow tables. Each flow table has a unique identity (ID for short), and in the embodiments of the present invention, the ID is referred to as a flow table ID. Each flow table is formed by several flow entries.

Referring to Table 1, content of a flow entry includes match fields and instructions.

TABLE 1

| Match Fields | Instructions |
| --- | --- |

A flow table ID is used for denoting a flow table to which the flow entry belongs. A match field is used for designating information that needs to be matched, for which matching is performed with various types of information such as a header field of a packet or other information associated with the packet (including an ID of an ingress port from which a switch receives the packet and metadata associated with the packet, where reference may be made to the following detailed description); and providing a designated value of the information that needs to be matched. An instruction is used for instructing how to perform an operation on a packet on which matching is performed successfully. Generally, under an instruction of the controller C, the switch S adds a flow entry to, deletes a flow entry from, and updates a flow entry in the flow table. Further, the content of the flow entry further includes a priority. The priority is used for indicating a sequence of matching between a packet and each flow entry in the flow table. Furthermore, the content of the flow entry further includes counters, timeouts, and a Cookie.

After the switch S receives a packet sent by the host PCx, matching starts to be performed between the packet and all flow entries in a first flow table that needs to be matched (generally a flow table whose flow table ID value is minimum). If the matching fails, the packet may be discarded or sent to the controller for processing (which may be completed by executing a Table-Miss flow entry in the flow table). If the matching is successful, an instruction in a flow entry on which the matching is performed successfully is executed. The instructions include multiple types, such as a packet processing instruction Action and a pipeline control instruction Goto-Table, and some instructions include a parameter. For example, it is assumed that an instruction is "Goto-Table Table2", where "Goto-Table" is an instruction type, and "Table2" is a parameter, and a meaning of the instruction is to skip to a flow table whose flow table ID is Table2 to continue to perform matching on and process the packet.

If an instruction in a flow entry on which matching is performed successfully is to skip to another flow table, skip to another flow table to continue to perform matching on and process the packet. That is, matching may be performed between the packet and multiple flow tables. Action also includes multiple types, such as Output Port1, where Output is an Action type that denotes packet sending, and Port1 is a parameter that denotes a port 1, and the entire Action denotes that a packet is sent out from the port 1. A matching and processing process of a packet and multiple flow tables is described in detail below.

Figure 2:
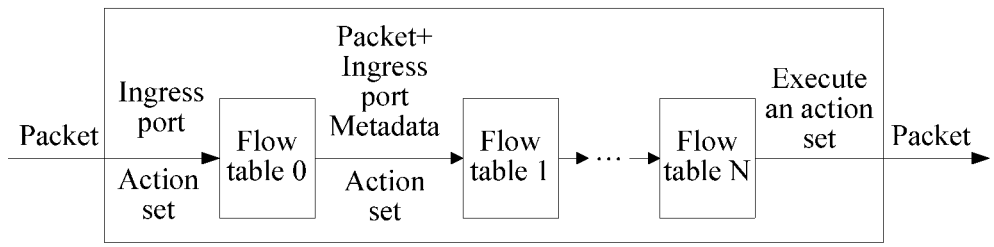
FIG. 2 is a schematic diagram of a process in which an OpenFlow switch processes a packet according to an embodiment of the present invention.

Referring to FIG. 2, it is assumed that a switch S receives, from an ingress port P1, a packet Packet sent by a host PC1. Matching is sequentially performed between the packet Packet and flow tables Table0 (a first flow table that needs to be matched), Table1, . . . , and TableN in the switch S.

After receiving the packet Packet, the switch sends the packet Packet and IDP1 of an ingress port to Table0 for pipeline-like matching. After Table0 completes matching and processing, the following information is obtained: IDP1 of an ingress port, a processed packet Packet+ and metadata associated with the packet Packet+, and skip to a next flow table according to Goto-Table to perform matching and processing, or the packet is discarded according to the Action instruction, or the packet is sent out from a port according to the Action instruction, or the packet is sent, according to the Action instruction, to the controller for processing. The metadata is dynamic information generated after Table0 processes the packet Packet, and the dynamic information needs to be used in a flow table between which and the packet Packet+ matching needs to be performed subsequently. For example, after the Packet is processed by Table0, a GRE header is removed from the Packet, and then the GRE header may be recorded in the metadata. The information is transferred to a next flow table, assumed as Table1, to perform matching. Similar to the processing process of Table0, after matching is completed for all flow tables between Table0 and TableN, the information is also obtained. After the information is transferred to TableN, TableN obtains a finally processed packet. It should be noted that, information transferred between flow tables is not limited to the foregoing enumerated information, for example, an action set may be further transferred between flow tables. An action set is an empty set initially (when a packet is sent to Table0), and is used for storing processing actions of instructions defined in a flow table, and these instructions may be transferred to another flow table, and executed finally in a flow table in which a pipeline terminates.

Embodiment 1

Figure 3:
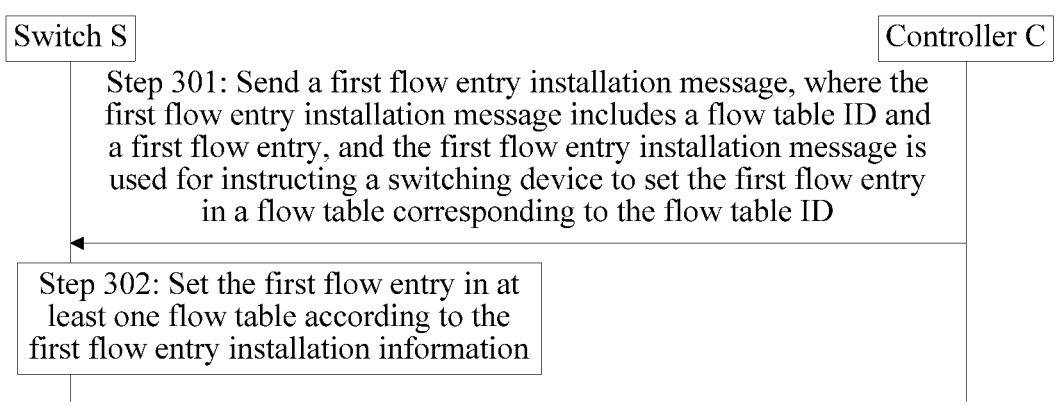
FIG. 3 is a flowchart of a method for configuring a switching device according to an embodiment of the present invention.

This embodiment of the present invention provides a method for configuring a switching device, where the method is applicable to the foregoing application scenario. Referring to FIG. 3, a process of the method includes:

Step 301: A controller sends a first flow entry installation message, where the first flow entry installation message includes a flow table ID and a first flow entry, and the first flow entry installation message is used for instructing a switching device to set the first flow entry in a flow table corresponding to the flow table ID.

The first flow entry includes a match field. The match field is used for designating information that needs to be matched, and instructing the switching device to perform matching between information that is of a received packet and needs to be matched and a first field of each record in a database.

The information that needs to be matched includes but is not limited to one or more of a packet header field, an ID of an ingress port from which the switching device receives the packet, and metadata associated with the packet. The information that needs to be matched is content currently defined in an OpenFlow protocol, and it is not excluded that in future, the OpenFlow protocol may define other or more information that needs to be matched.

Each record in the database includes the first field, and the first field is used for denoting a designated value of the information that needs to be matched.

Specifically, the database may be preset in the switching device. Further, the switching device may create the database according to a manually input configuration command, or the switching device creates the database under an instruction of the controller.

Step 302: The switching device sets the first flow entry in at least one flow table according to the first flow entry installation message.

Specifically, the switching device sets the first flow entry in the flow table corresponding to the flow table ID that is in the first flow entry installation message.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 2

Figure 4:
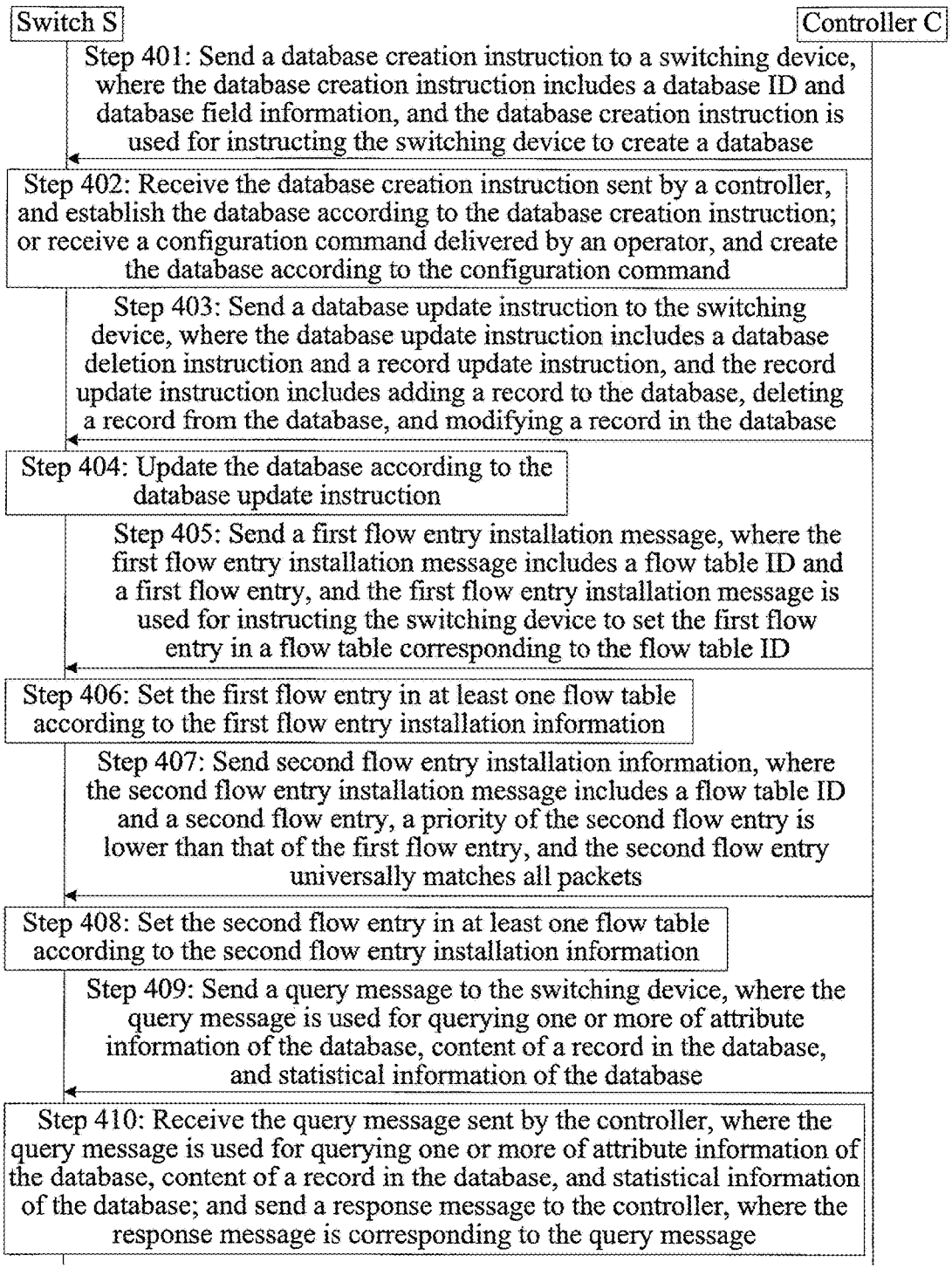
FIG. 4 is a flowchart of another method for configuring a switching device according to an embodiment of the present invention.

This embodiment of the present invention provides a method for configuring a switching device, where the method is applicable to the foregoing application scenario. Referring to FIG. 4, a process of the method includes:

Step 401: A controller sends a database creation instruction to a switching device, where the database creation instruction is used for instructing the switching device to create a database.

Specifically, the controller includes but is not limited to the controller C shown in FIG. 1, the switching device includes but is not limited to the switch S in FIG. 1, and one or more flow tables are set in the switch S.

Specifically, the controller may send the database creation instruction to the switching device by using an OpenFlow message. The database creation instruction includes a database ID and database field information, where the database field information includes a field name. The database field information may further include a data type, a length, and a default value of a field, and whether the field is a keyword of the database.

For example, it is assumed that the database creation instruction carried in the OpenFlow message is "Create DataBase: DataBase ID=0, Fields (MAC, Port-ID)". In the database creation instruction, the database ID is 0, and a record in the database includes two fields: a Media Access Control (MAC for short) address field and a Port-ID field. Further, a data type and a length of each field may be designated, for example, it may be designated that the MAC address field is a character array whose length is 6, and the Port-ID field is a 32-bit unsigned integer. It may be further designated whether a field is a primary keyword of the database, for example, in this embodiment, the controller may designate the MAC address field as the primary keyword, and in this way, a record of the database may be uniquely determined by using a MAC address.

Further, the database creation instruction may further include at least one of database attribute information and statistical information. The database attribute information includes one or more of a maximum quantity of records in the database, a timeout of a record, and whether to allow the switching device to alter a record in the database. The statistical information includes one or more of a total quantity of records in the database, a total quantity of matching between the database and packets, a total quantity of times of successful matching, and a total quantity of times of successful matching of each record.

Step 402: The switching device receives the database creation instruction sent by the controller, and establishes the database according to the database creation instruction.

It should be noted that, the switching device may further receive a configuration command delivered by an operator, and create the database according to the configuration command.

Step 403: The controller sends a database update instruction to the switching device, where the database update instruction includes a database deletion instruction and a record update instruction, and the record update instruction includes adding a record to the database, deleting a record from the database, and modifying a record in the database.

The controller may control, according to service needs and at any time, the switching device to alter the database. Specifically, the controller may send the database update instruction to the switching device by using an OpenFlow message. For example, it is assumed that the record update instruction is Add Record: DataBase ID=0, Fields (MAC=MAC1, Port-ID=1). The record update instruction is used for instructing the switching device to add such a record to a database 0 as: a MAC field value is MAC1, and a Port-ID field value is 1.

It is assumed that the database created by the switching device is a database shown in Table 2, an ID of the database is 0, the database includes 2 records, and each record includes a MAC field and a Port-ID field.

TABLE 2

| DataBase 0 | |
|---|---|
| MAC | Port-ID |
| MAC1 | 1 |
| MAC2 | 2 |

It should be noted that, the switching device may establish the database in storage space of the switching device, or may also establish the database in a physical device outside the switching device.

Step 404: The switching device updates the database according to the database update instruction.

Specifically, step 404 includes: deleting, by the switching device, a designated database according to the database deletion instruction; and updating a record in the database according to the record update instruction.

Before the switching device updates the database according to the database update instruction, the method includes: querying, by the switching device, whether a to-be-updated database exists, and whether a to-be-updated record exists. When neither the to-be-updated database nor the to-be-updated record exists, the switching device reports, to the controller, a message denoting that neither the to-be-updated database nor the to-be-updated record exists.

Step 405: The controller sends a first flow entry installation message, where the first flow entry installation message includes a flow table ID and a first flow entry, and the first flow entry installation message is used for instructing the switching device to set the first flow entry in a flow table corresponding to the flow table ID.

The first flow entry includes a match field. The match field is used for designating information that needs to be matched, and instructing the switching device to perform matching between information that is of a received packet and needs to be matched and a first field of each record in a database, to obtain a first record matching the packet. The information that needs to be matched includes one or more of a packet header field, an ID of an ingress port from which the switching device receives the packet, and metadata associated with the packet.

A first field is used for denoting a designated value of information that needs to be matched, and a second field is used for denoting a packet processing parameter. Specifically, each field of each record in the database may be used as the first field or the second field, which depends on match fields and packet processing instructions of different flow entries in a flow table. For example, a MAC address field in Table 2 may be used as the first field, and a Port-ID field may be used as the first field, and may further be used as the second field.

Further, the match field may be further used for designating an ID of the database, and instructing the switching device to perform matching between the value of the information that is of the received packet and needs to be matched and the first field of each record in the database, whose identity is the ID of the database.

For example, it is assumed that the flow table ID carried in the first flow entry installation message is "Table ID=0", and the first flow entry is "Match ((SRC MAC=MAC, In Port=Port-ID), DataBase ID=0), Instructions (Goto-Table Table1)". "Match ((SRC MAC=MAC, In Port=Port-ID)" is a match field, information that is designated by the match field and needs to be matched is SRC MAC (a source MAC address) and In Port (a port from which a packet is received), and a database ID designated by the match field is 0. The match field is used for instructing the switching device to perform matching between the SRC MAC of the received packet and a MAC value of a MAC field in the database ID and between the In Port of the received packet and a Port value of a Port-ID field separately. According to an indication of the match field, both the MAC field and the Port-ID field in the database are used as the first field.

In an implementation manner of this embodiment of the present invention, the first flow entry further includes a packet processing instruction, and the packet processing instruction is used for instructing the switching device to: after a first record matching the packet is obtained, process the packet according to the packet processing instruction by using a second field in the first record as a parameter.

Instructions of a flow entry include many types, besides that a type of instructions described above is the Goto-Table instruction for performing skipping between flow tables, there is another type of instructions that is an action instructing a switch how to perform an operation on a packet, such as forwarding, discarding, modifying a packet header, encapsulating, decapsulating, and sending a packet to the controller. In this embodiment of the present invention, this type of instructions is referred to as a packet processing instruction.

For example, it is assumed that the flow table ID carried in the first flow entry installation message is "Table ID=1", and the first flow entry is "Match ((DST MAC=MAC), DataBase ID=0), Instructions Apply-Actions (Output (MatchRecord. Port-ID)))". "Instructions Apply-Actions (Output (MatchRecord. Port-ID)" is a packet processing instruction, and is used for instructing the switching device to: after a first record matching a packet (a record that is in the database and includes a MAC field, where a value of the MAC field of the record is the same as a value of DST MAC in the packet) is obtained, forward the packet to a Port indicated by a value of a Port-ID field in the first record. The Port-ID field of the record in the database is used as a second field.

The database includes several records, and each record includes a first field, and therefore, a situation in which there are multiple first records matching a packet may occur. In this situation, a processing manner of installing different match fields and packet processing instructions to indicate a packet may be used. This embodiment provides two types of different match fields and packet processing instructions.

First type: the match field is used for instructing the switching device to perform matching between the value of the information that is of the received packet and needs to be matched and the first field of each record in the database, to obtain a first one of multiple first records matching the packet; and the packet processing instruction is used for instructing the switching device to: process the packet according to the packet processing instruction by using a second field of the first one of the first records as a parameter.

For example, it is assumed that the flow table ID carried in the first flow entry installation message is "Table ID=Y", and the first flow entry is "MatchFirst ((SRC IP=Field2), DataBase ID=X), Instructions Apply-Actions (Set-Field (SRC MAC, MatchRecord. Field1)), Goto-Table TableM)". The match field of the first flow entry is used for instructing to perform matching between SRC IP in the packet and a field Field2 of a record in the database, to obtain the first matching one of the first records, and the packet processing instruction is used for instructing to set SRC MAC of the packet to a value of a field1 of the first record, and then skip to a flow table M for processing.

Second type: the match field is used for instructing the switching device to perform matching between the value of the information that is of the received packet and needs to be matched and the first field of each record in the database, to obtain multiple first records matching the packet; and the packet processing instruction is used for instructing the switching device to: process multiple packets, which are duplicated by the switching device, according to the packet processing instruction by using a second field of each of the multiple first records as a parameter.

For example, it is assumed that the flow table ID carried in the first flow entry installation message is "Table ID=Z", and the first flow entry is "MatchAll ((DST IP=Field3) DataBase ID=X), Instructions Apply-Actions (Set-Field (SRC MAC, MatchRecord. Field1)), Goto-Table TableN)". The match field of the first flow entry is used for instructing to perform matching between DST IP in the packet and a field Field3 of a record in the database, to obtain all matching first records (it is assumed that there are two first records). The switching device duplicates the packet into two copies. The packet processing instruction is used for instructing to separately set SRC MAC of two packets to values of Field1 in these two records, and then skip to a flow table N for processing.

In another implementation manner of this embodiment of the present invention, the first flow entry further includes a record processing instruction, and the record processing instruction is used for instructing the switching device to: after a first record matching the packet is obtained, perform an operation on a designated record in a designated database.

Further, the record processing instruction may include one or more of the following instructions: a first modification instruction, a second modification instruction, an addition instruction, and a deletion instruction, where the first modification instruction is used for instructing the switching device to: when a first record matching the packet exists in the database, perform calculation on a current value of a first designated field of a first designated record in a first designated database, to obtain an update value of the first designated field and record the update value into the first designated database; the second modification instruction is used for instructing the switching device to: when a first record matching the packet is in the database, modify a current value of a second designated field of a second designated record in a second designated database into a set value; the addition instruction is used for instructing the switching device to: when a first record matching the packet exists in the database, add a third designated record to a third designated database; and the deletion instruction is used for instructing the switching device to: when a first record matching the packet exists in the database, delete a fourth designated database or a fourth designated record in the fourth designated database.

Specifically, the first, second, third, and fourth designated databases are databases corresponding to database IDs specified in the record processing instruction. It may be known that, the first, second, third, and fourth designated databases may be a same database or may also be different databases. Moreover, when no database ID is specified in the record processing instruction, the database is the current database by default, and then the record processing instruction is used for instructing the switching device to: after a first record matching the packet is obtained, perform an operation on the first record. For example, it is assumed that the record processing instruction is "UpdateDatabase (MatchRecord.Sequence-Number=(MatchRecord.Sequence-Number+1)mod(2**32)), Goto-Table Table2)". The record processing instruction is used for instructing to perform a modulo operation of $2^{32}$ on a value of a field Sequence-Number in the first record plus one, and then update a modulo operation result to the database, and then skip to Table2.

Step 406: The switching device sets the first flow entry in at least one flow table according to the first flow entry installation message.

For example, it is assumed that the switching device separately establishes, in Table0 and Table1, first flow entries shown in Table 3 and Table 4 according to the first flow entry installation message sent by the controller in step 405.

TABLE 3

Table 0

| Match field | Goto-Table instruction |
|---|---|
| MAC field whose source MAC = DataBase 0, Port-ID field whose ingress port = DataBase 0 | Goto-Table Table 1 |

TABLE 4

Table 1

| Match field | Packet processing instruction |
|---|---|
| MAC field whose destination | Output (matching a Port-ID |

TABLE 4-continued

Table 1

| Match field | Packet processing instruction |
|---|---|
| MAC = DataBase 0 | field of a record) |

It should be noted that, before the switching device sets the first flow entry in the flow table, the method includes: querying, by the switching device, whether the database exists, and when the database exists, setting the first flow entry in the flow table; and when the database does not exist, reporting, by the switching device, a message denoting that the database does not exist to the controller.

Step 407: The controller sends second flow entry installation message, where the second flow entry installation message includes a flow table ID and a second flow entry, a priority of the second flow entry is lower than that of the first flow entry, and the second flow entry universally matches all packets.

The second flow entry includes a record addition instruction, where the record addition instruction is used for instructing the switching device to add, according to a packet matching the second flow entry, a record to a designated database.

Specifically, each flow entry in a flow table includes a priority, and the priority is used for indicating a sequence of matching between a packet and each flow entry.

It is assumed that the second flow entry is "Table-Miss, Instructions (Apply-Actions (UpdateDatabase (DataBase ID=0, Find: SRC MAC=MAC, UpdateContent (SRC MAC=MAC, Port-ID=In Port))), Goto-Table Tablet)", where "Table-Miss" refers to that there is no matching content, that is, all packets are universally matched. "UpdateDatabase (DataBase ID=0, Find: SRC MAC=MAC, UpdateContent (SRC MAC=MAC, In Port=Port-ID))" refers to that in a database whose database ID is 0, a record whose MAC address is a source MAC address of a packet is searched for, and if the record is not found, the source MAC address of the packet, and an ingress port P1 are added to the database; and if the record is found, neither the source MAC address of the packet nor the ingress port P1 needs to be added, and an ID of the port is directly updated to In Port.

Step 408: The switching device sets the second flow entry in at least one flow table according to the second flow entry installation message.

For example, it is assumed that the switching device establishes, in Table0, a second flow entry shown in Table 5 according to the second flow entry installation message sent by the controller in step 407, the second flow entry has a low priority, and the first flow entry in Table 0 has a high priority.

TABLE 5

Table 0

| Priority | Match field | Instruction |
|---|---|---|
| High priority | MAC field whose source MAC = DataBase 0, Port-ID field whose ingress port = DataBase 0 | Goto-Table Table 1 |
| Low priority | Table-Miss | UpdateDatabase: SRC MAC = MAC, In Port = Port-ID, Goto-Table Table 1 |

Step 409: The controller sends a query message to the switching device, where the query message is used for querying one or more of attribute information of the database, content of a record in the database, and statistical information of the database.

Step 410: The switching device receives the query message sent by the controller, where the query message is used for querying one or more of attribute information of the database, content of a record in the database, and statistical information of the database; and sends a response message to the controller, where the response message is corresponding to the query message.

Specifically, that the response message is corresponding to the query message includes: matching content found according to content that is indicated by the query message and that the controller needs to query. Both the query message and the response message may be in a format of an OpenFlow message.

It should be noted that, this embodiment does not limit an execution sequence between steps of steps 403, 405, 407, and 409.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 3

Figure 5:
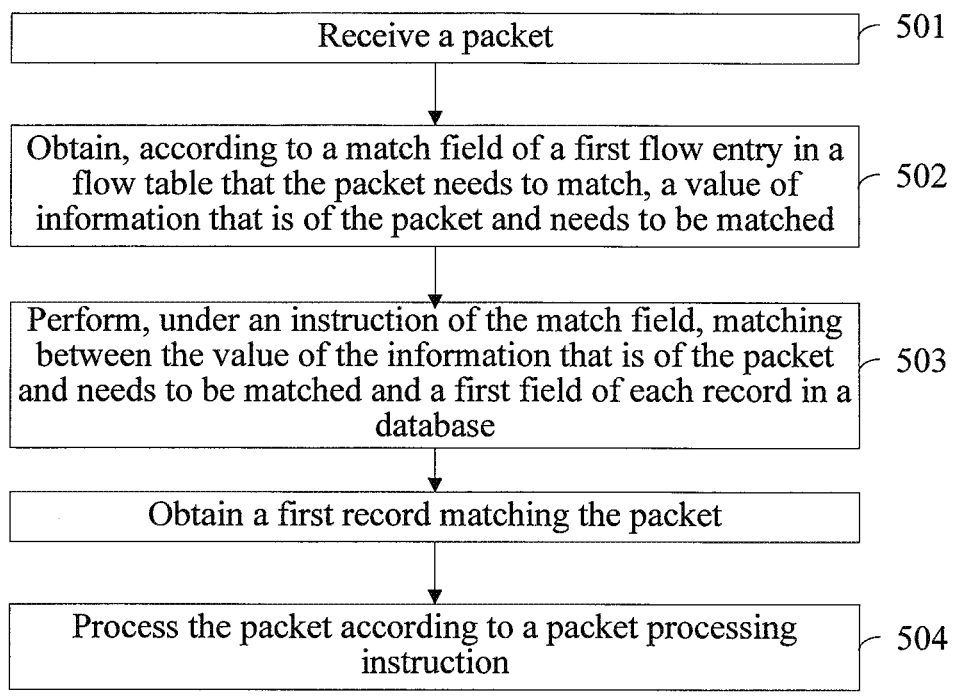
FIG. 5 to FIG. 8 are flowcharts of a method for processing a packet according to an embodiment of the present invention.

This embodiment of the present invention provides a method for processing a packet, where the method is applicable to the foregoing application scenario, and may be executed by a switch S shown in FIG. 1. One or more flow tables are set in the switch S. Referring to FIG. 5, a process of the method includes:

Step 501: Receive a packet.

Further, when receiving the packet, a switching device obtains an ID of an ingress port from which the packet is received, and metadata associated with the packet.

Step 502: Obtain, according to a match field of a first flow entry in a flow table that the packet needs to match, a value of information that is of the packet and needs to be matched.

The first flow entry includes a match field and a packet processing instruction, and the match field is used for designating information that needs to be matched. The information that needs to be matched includes one or more of a packet header field, an ID of an ingress port from which the switching device receives the packet, and metadata associated with the packet.

Step 503: Perform, under an instruction of the match field, matching between the value of the information that is of the packet and needs to be matched and a first field of each record in a database.

When a first record matching the packet is obtained, step 504 is performed. When no first record matching the packet is obtained, the packet may be sent to a controller, or discarding processing is performed on the packet.

A first field is used for denoting a designated value of information that needs to be matched.

Step 504: Process the packet according to a packet processing instruction.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 4

This embodiment of the present invention provides a method for processing a packet, and in this embodiment, it is assumed that two flow tables are maintained in a switch S shown in FIG. 1, where one is used for processing a received Ethernet packet, and mainly completing a MAC address learning function, and is hereinafter referred to as a learning table (it is assumed that an ID of the learning table is Table0, and the learning table is a first flow table); the other is used for processing outward sending of an Ethernet packet, and mainly completing an Ethernet packet forwarding function, and is hereinafter referred to as a forwarding table (it is assumed that an ID of the forwarding table is Table1). After the learning table finishes processing a packet, skip to the forwarding table by using an instruction to perform sending processing. The hosts PC1 and PC2 shown in FIG. 1 are connected to a port P1 and a port P2 of S respectively, and S is connected to a controller C. An IP of P1 is IP1, and a MAC address of P1 is MAC1. An IP of P2 is IP2, and a MAC address of P2 is MAC2. PC1 intends to communicate with PC2 for the first time (PC1 knows an IP address of PC2, and meanwhile PC1 and PC2 do not know MAC addresses of each other). First, PC1 sends an Address Resolution Protocol (ARP for short) request packet to S, to request to resolve the MAC address corresponding to IP2 (a broadcast is made to all hosts, and after receiving the broadcast, the host whose IP address is IP2 informs PC1 of the MAC address). The ARP request packet includes the MAC address MAC1 of PC1, a destination MAC address (a broadcast MAC address, that is, FFFFFFFFFFFF), and the IP address IP2 for requesting to resolve a MAC address.

Figure 6:
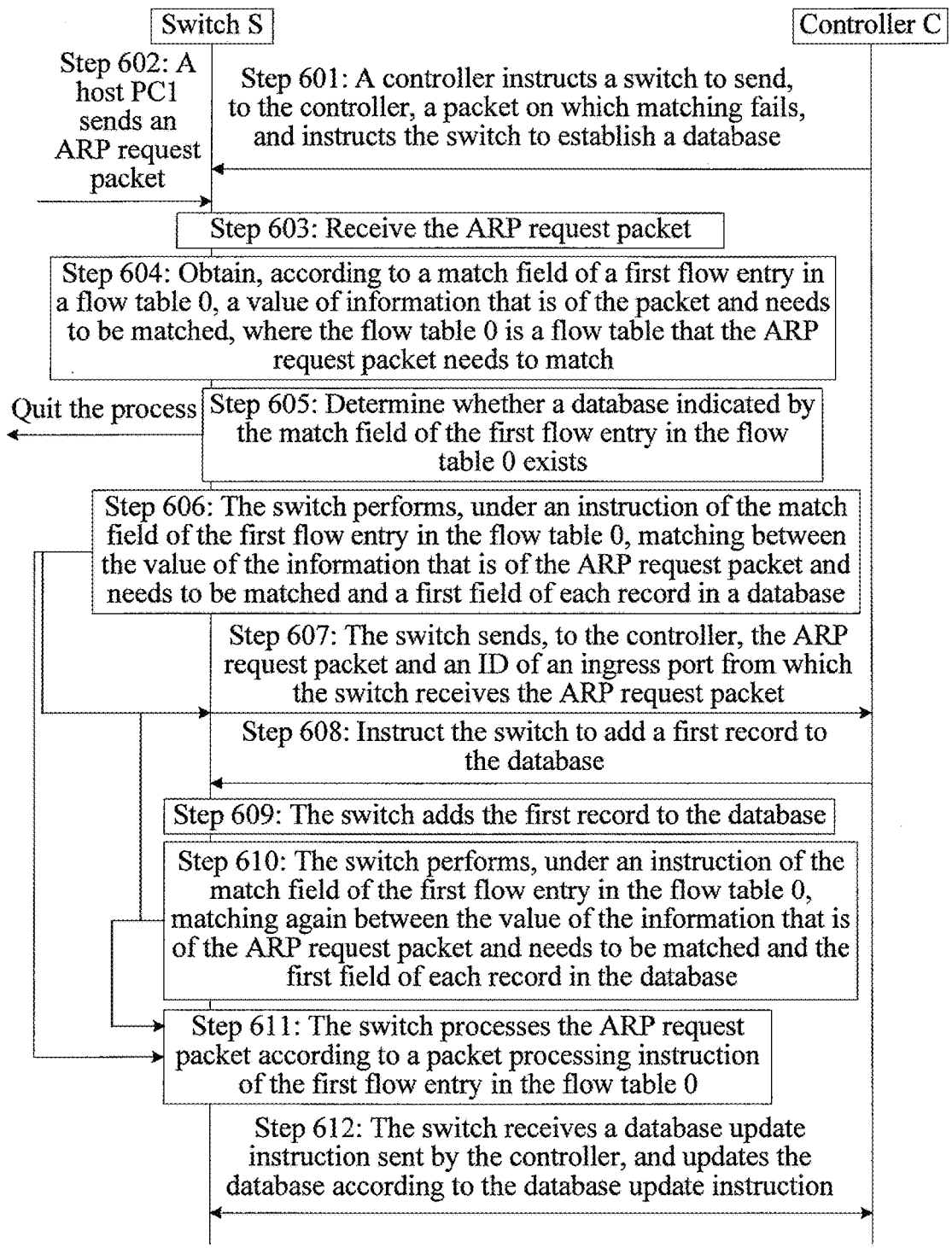

Referring to FIG. 6, a process of the method includes:

Step 601: A controller instructs a switch to send, to the controller, a packet on which matching fails, and instructs the switch to establish a database.

First, the controller instructs the switch to separately install a Table-Miss flow entry in Table0 and Table1. The Table-Miss flow entry instructs the switch to send a packet that fails to match Table0 or Table1 to the controller. It is assumed that a Table-Miss flow entry in Table0 is "Table ID=0, Table-Miss, Instructions (Apply-Actions (Output (CONTROLLER)))"; and a Table-Miss flow entry in Table1 is "Table ID=1, Table-Miss, Instructions (Apply-Actions (Output (CONTROLLER)))".

It should be noted that, a priority of a Table-Miss flow entry is lower than those of other flow entries in Table0 and Table1, and in this way, it can be ensured that matching between a packet and a Table-Miss flow entry is performed only after matching between the packet and other flow entries fails.

Second, the controller instructs the switch to install a flow entry in Table1, and the flow entry instructs the switch to send a packet whose destination MAC address is a broadcast address to ALL ports (ALL ports refer to all ports on the switch except a port from which the packet is received, that is, broadcast). It is assumed that the flow entry is "Table ID=1, Match (DST MAC=FFFFFFFFFFFF), Instructions (Apply-Actions (Output (ALL)))".

Then, the controller instructs, by using an OpenFlow message, the switch to create a database. It is assumed that the OpenFlow message is "Create DataBase: DataBase ID=0, Fields (MAC, Port-ID)".

Finally, the controller instructs the switch to install a first flow entry in Table0, where the first flow entry instructs the switch to perform matching between a source MAC address of an Ethernet packet and a MAC address of each record in a designated database and between an ID of the ingress port of the Ethernet packet and a port ID field of each record in the designated database, and if the matching is successful, skip to Table1. It is assumed that the first flow entry is "Table ID=0, Match ((SRC MAC=MAC, In Port=Port-ID), DataBase ID=0), Instructions (Goto-Table Table1)".

Step 602: A host PC1 sends an ARP request packet.

The ARP request packet requests to resolve a MAC address corresponding to IP2. A source MAC address of the packet is MAC1, and a destination MAC address of the packet is a broadcast address (that is, FFFFFFFFFFFF).

Step 603: The switch receives the ARP request packet.

Specifically, the switch S receives the ARP request packet from an ingress port P1.

Step 604: The switch obtains, according to a match field of a first flow entry in Table0, a value of information that is of the packet and needs to be matched. Table0 is a flow table that the ARP request packet needs to match.

The first flow entry includes a match field and a packet processing instruction, and the match field is used for designating information that needs to be matched; the information that needs to be matched includes one or more of a packet header field, an ID of an ingress port from which the switching device receives the packet, and metadata associated with the packet.

Further, the match field is further used for designating an ID of the database, and instructing the switch to perform matching between the value of the information that is of the received packet and needs to be matched and the first field of each record in the database, whose ID is the ID of the database.

Specifically, in this embodiment, a first flow table that the ARP request packet needs to match is a learning table Table0. It is assumed that the first flow entry is a first flow entry established in step 601, and information that is designated by a match field of the first flow entry and needs to be matched is IDP1 of an ingress port from which the ARP request packet is received and a source MAC address MAC1 of the ARP request packet (that is, a header field in an Ethernet frame header).

Step 605: The switch determines whether a database indicated by the match field of the first flow entry in Table0 exists, and if the database exists, performs step 606; if the database does not exist, quits the current process.

Specifically, the match field is further used for designating an ID of the database. The switch traverses all databases according to the ID of the database, and if the database is found, determines that the database exists; if the database is not found, determines that the database does not exist.

Step 606: The switch performs, under an instruction of the match field of the first flow entry in Table0, matching between the value of the information that is of the ARP request packet and needs to be matched and a first field of each record in the database.

When a first record matching the ARP request packet is obtained, step 611 is performed. When no first record matching the ARP request packet is obtained, step 607 is performed.

Specifically, if the switch S has not learned the MAC address and Port-ID of PC1 (the controller does not inform the switch S of the MAC address and Port-ID of the host PC1), MAC1 and P1 do not exist in a MAC field and Port-ID of each record in the database indicated by the match field of the first flow entry in the learning table Table0. In this case, the matching between the value of the information that is of the packet and needs to be matched and the first field of each record in the database fails, and no first record matching the packet is obtained. Otherwise, if the switch S has learned MAC1 and P1, MAC1 and P1 exist in the database, and a first record matching the packet is obtained.

Step 607: The switch sends, to the controller, the ARP request packet and an ID of an ingress port from which the switch receives the ARP request packet.

Specifically, a Table-Miss flow entry is installed in each flow table in the switch in advance, that is, if the matching fails, the packet is discarded or sent to the controller for processing. In this embodiment of the present invention, the packet is sent to the controller for processing.

The switch sends the ARP request packet and the ID of the ingress port to the controller by using an OpenFlow message. Moreover, the switch may further buffer the ARP request packet, and send a buffer identity to the controller. For example, the OpenFlow message sent by the switch to the controller is Packet-In (an ARP request packet, where In Port=1, and Buffer-ID=1).

Step 608: The controller instructs the switch to add a first record to the database.

After reception, the controller sends (by using an OpenFlow message) a record update instruction to the switch, where the record update instruction instructs the switch to add a record of MAC1 and P1 to the database. If the switch buffers the ARP request packet, the controller may further carry a buffer identity in the record update instruction, and if the switch does not buffer the ARP request packet, the controller needs to return the ARP request packet to the switch. For example, the record update instruction is Add Record: DataBase ID=0, Fields (MAC=MAC1, Port-ID=1), Buffer-ID=1.

Step 609: The switch adds the first record to the database.

Specifically, after receiving a record addition instruction sent by the controller, the switch adds the first record to the database according to the record addition instruction.

Step 610: The switch performs, under an instruction of the match field of the first flow entry in Table0, matching again between the value of the information that is of the ARP request packet and needs to be matched and the first field of each record in the database.

When a first record matching the ARP request packet is obtained, step 611 is performed. When no first record matching the ARP request packet is obtained, step 607 is performed.

In this embodiment of the present invention, after step 609 is performed, matching on the ARP request packet may be performed again, that is, the switch performs, under an instruction of the match field, matching again between the value of the information that is of the packet and needs to be matched and the first field of each record in the database.

Specifically, a record whose MAC field is MAC1 and whose port ID field is 1 exists in the database, and therefore, matching on Table0 is performed successfully, to obtain a first record matching the ARP request packet.

Step 611: The switch processes the ARP request packet according to a packet processing instruction of the first flow entry in Table0.

Specifically, an instruction of a flow entry in the learning table Table0 is "Instructions (Goto-Table Table1)", that is, the foregoing skipping instruction. That is, when MAC1 and P1 exist in the database, skip to the forwarding table Table1 to continue to process the packet information.

Because a flow entry "Match (DST MAC=FFFFFFFFFFFF), Instructions (Apply-Actions (ALL))" is installed in the forwarding table Table1 in advance, where DST MAC refers to a destination MAC address, and Apply-Actions (ALL) refers to sending the packet to all ports, and because the destination MAC address of the ARP request packet is FFFFFFFFFFFF, matching on Table1 is performed successfully, and an instruction of sending the packet to all ports (excluding the ingress port P1 of the ARP request packet) is executed.

Step 612: The switch receives a database update instruction sent by the controller, and updates the database according to the database update instruction.

The database update instruction includes a database deletion instruction and a record update instruction. The updating the database according to the database update instruction includes: deleting a designated database according to the database deletion instruction; and updating a record in the database according to the record update instruction.

The record update instruction includes adding a record to the database, deleting a record from the database, and modifying a record in the database.

The controller may control, according to service needs and at any time, the switch to alter the database and a record.

It should be noted that, before updating the database according to the database update instruction, the switch may detect whether a to-be-updated database exists, and whether a to-be-updated record exists. When neither the database nor the record exists, the switch may report to the controller.

It should be noted that, this embodiment of the present invention does not limit an execution sequence of step 612, and step 612 may be performed before or after any step of this embodiment.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 5

Figure 7:
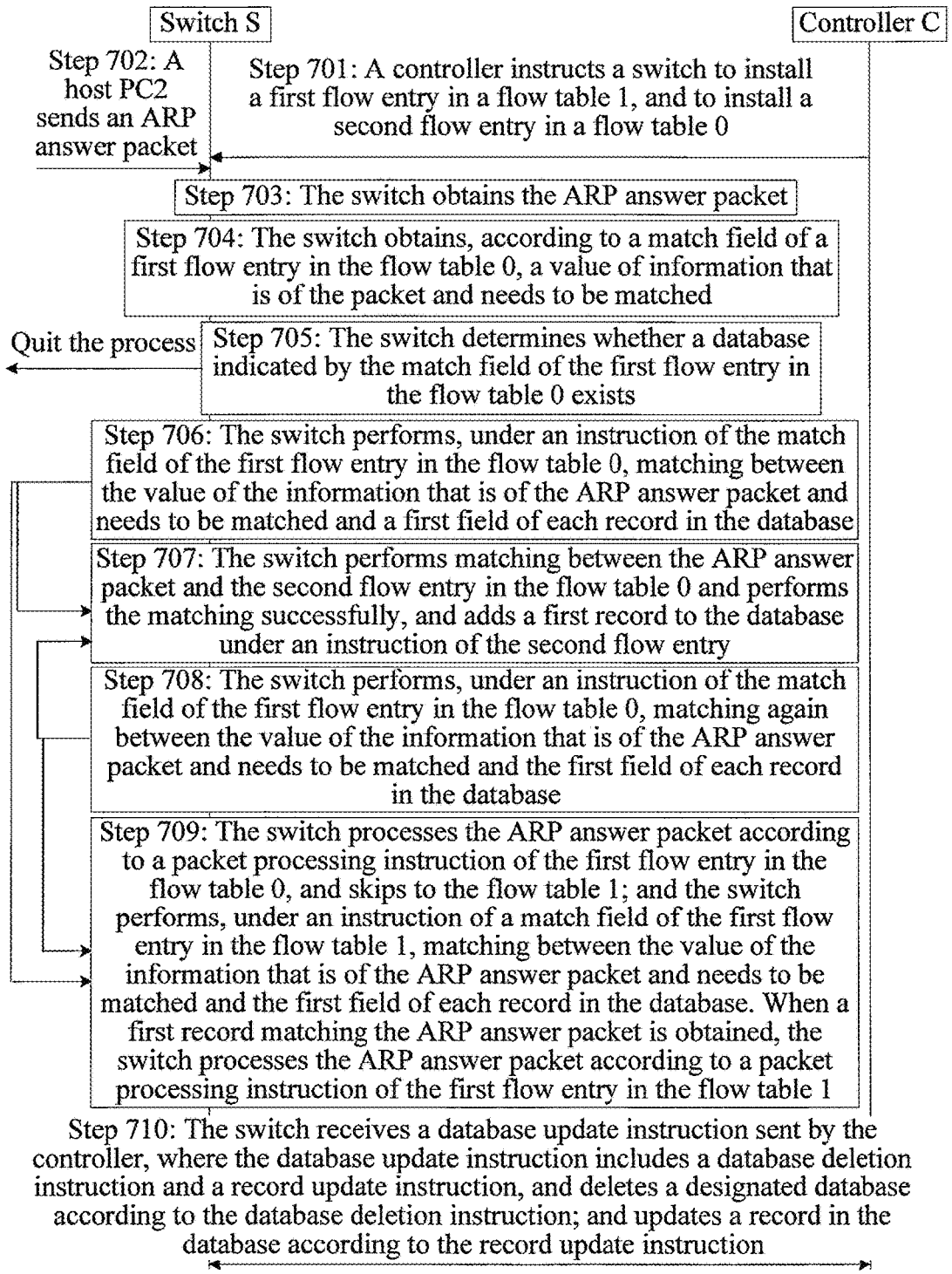

This embodiment of the present invention provides a method for processing a packet. In Embodiment 4 of the present invention, a switch S completes forwarding, to all ports (excluding an ingress port P1 of an ARP request packet), the ARP request packet sent by a host PC1. In this embodiment of the present invention, it is assumed that after receiving the ARP request packet, a host PC2 replies to the switch S by using an ARP answer packet, where the ARP answer packet includes a MAC address MAC2 of PC2, and a destination MAC address MAC1. On this premise, referring to FIG. 7, this embodiment of the present invention provides a method for processing a packet, where a process of the method includes:

Step 701: A controller instructs a switch to install a first flow entry in Table1, and to install a second flow entry in Table0.

It is assumed that the first flow entry is "Table ID=1, Match ((DST MAC=MAC), DataBase ID=0), Instructions Apply-Actions (Output (MatchRecord. Port-ID)))". A match field of the first flow entry is used for instructing to perform matching between a destination MAC address of a packet and DST MAC of a record in a database 0, and if a matching first record exists in the database 0, the packet is forwarded to a port stored in a Port-ID field of the first record.

It is assumed that the second flow entry is "Table ID=0, Table-Miss, Instructions (Apply-Actions (UpdateDatabase (DataBase ID=0, Find: SRC MAC=MAC, UpdateContent (SRC MAC=MAC, In Port=Port-ID))), Goto-Table Table1)", where "Table-Miss" refers to that there is no matching content, that is, all packets are universally matched. "UpdateDatabase (DataBase ID=0, Find: SRC MAC=MAC, UpdateContent (SRC MAC=MAC, In Port=Port-ID))" refers to that in a database 0, a record whose MAC address is a source MAC address of a packet is searched for in a MAC field, and if the record is not found, the source MAC address of the packet, and an ingress port P1 are added to the database 0; and if the record is found, neither the source MAC address of the packet nor the ingress port P1 needs to be added, and Port-ID is directly updated to In Port.

It should be noted that, step 701 and step 601 in Embodiment 4 of the present invention may be performed at the same time.

Step 702: A host PC2 sends an ARP answer packet.

Specifically, after receiving the ARP request packet, the host PC2 replies to PC1 by using an ARP answer packet, where a source MAC address of the ARP answer packet is MAC2, and a destination MAC address of the ARP answer packet is MAC1, and the switch receives the ARP answer packet from a port P2.

Step 703: The switch obtains the ARP answer packet.

Specifically, after receiving the ARP answer packet from the ingress port P2, the switch S sends the packet to a learning table Table0 to perform matching.

Step 704: The switch obtains, according to a match field of a first flow entry in Table0, a value of information that is of the packet and needs to be matched.

Specifically, in this embodiment, a first flow table that the ARP answer packet needs to match is the learning table Table0. The information that is of the ARP answer packet and needs to be matched is an ID P2 of the ingress port of the ARP answer packet and the source MAC address MAC2 from which the ARP request packet is sent.

Specifically, step 704 is the same as step 604 in Embodiment 4 of the present invention, and description thereof is omitted herein.

Step 705: The switch determines whether a database indicated by a match field of the first flow entry in Table0 exists, and if the database exists, performs step 706; if the database does not exist, quits the current process.

Specifically, step 705 is the same as step 605 in Embodiment 4 of the present invention, and description thereof is omitted herein.

Step 706: The switch performs, under an instruction of the match field of the first flow entry in Table0 matching between the value of the information that is of the ARP answer packet and needs to be matched and a first field of each record in a database.

When a first record matching the ARP answer packet is obtained, step 709 is performed. When no first record matching the ARP answer packet is obtained, step 707 is performed.

Similar to a process of processing the ARP request packet (reference may be made to step 606 in Embodiment 4 of the present invention), after the switch receives the ARP answer packet, matching is performed on the source MAC address MAC2 of the ARP answer packet in a database indicated by first indication information of a flow entry in the learning table Table0. If the switch S has not learned a MAC address of PC2 (the controller does not inform the switch S of the MAC address of the host PC2), MAC2 does not exist in the database. Otherwise, if the switch S has learned MAC2, MAC2 exists in the database.

Step 707: The switch performs matching between the ARP answer packet and the second flow entry in Table0 and performs the matching successfully, and adds a first record to the database under an instruction of the second flow entry.

Specifically, the switch S adds a record whose MAC address is MAC2 and whose port is P2 to a database whose database ID is 0. MAC2 is corresponding to P2.

Step 708: The switch performs, under an instruction of the match field of the first flow entry in Table0, matching again between the value of the information that is of the ARP answer packet and needs to be matched and the first field of each record in the database.

When a first record matching the ARP answer packet is obtained, step 709 is performed.

Step 709: The switch processes the ARP answer packet according to a packet processing instruction of the first flow entry in Table0, and skip to Table1; and the switch performs, under an instruction of the match field of the first flow entry in Table1, matching between the value of the information that is of the ARP answer packet and needs to be matched and the first field of each record in the database. When a first record matching the ARP answer packet is obtained, the switch processes the ARP answer packet according to a packet processing instruction of the first flow entry in Table1.

Specifically, as described in step 701, the first flow entry installed in Table1 is "Table ID=1, Match ((DST MAC=MAC), DataBase ID=0), Instructions Apply-Actions (Output (MatchRecord. Port-ID)))". A match field of the first flow entry is used for instructing to perform matching between the destination MAC address of the packet and DST MAC of a record in the database 0, and the packet processing instruction of the first flow entry is used for instructing to: if a matching first record exists in the database 0, forward the ARP answer packet by using a Port-ID field of the first record as a port parameter and output the ARP answer packet to a port denoted by the port parameter.

The host PC1 obtains, by using the port P1, the ARP answer packet sent by the host PC2, and can know the MAC address of the host PC2 by resolving the ARP answer packet. In this way, both the host PC1 and the host PC2 know IP and MAC addresses of each other, and the host PC1 and the host PC2 may transfer packets to each other. Moreover, by using the entire process shown in FIG. 6 and FIG. 7, the switch stores the IP and MAC addresses of the host PC1 and the host PC2, and when the host PC1 and the host PC2 may transfer packets to each other, the switch can smoothly forward the packets of the two.

Step 710: The switch receives a database update instruction sent by the controller, where the database update instruction includes a database deletion instruction and a record update instruction, and deletes a designated database according to the database deletion instruction, and updates a record in the database according to the record update instruction.

The record update instruction includes adding a record to the database, deleting a record from the database, and modifying a record in the database.

The controller may control, according to service needs and at any time, the switch to alter the database and a record.

It should be noted that, before updating the database according to the database update instruction, the switch may detect whether a to-be-updated database exists, and whether a to-be-updated record exists. When neither the database nor the record exists, the switch may report to the controller.

It should be noted that, this embodiment of the present invention does not limit an execution sequence of step 710, and step 710 may be performed before or after any step of this embodiment.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 6

This embodiment of the present invention provides a method for processing a packet, and in this embodiment, it is assumed that a controller instructs a switch to create a database whose database ID is 1. Each record in the database includes four fields: a GRE tunnel ID, an outer source IP address (Outer-SRC-IP), an outer destination IP address (Outer-DST-IP), and a sequence number. A default value of the outer source IP address is 2.2.2.2, and a default value of the sequence number is 0. Optionally, the controller may designate that a primary keyword is the GRE tunnel ID. Moreover, two flow tables Table2 (a first flow table) and Table3 are maintained in the switch. The controller instructs the switch to install a flow entry in Table2, and instructs the switch to write a GRE tunnel ID of a packet whose destination IP address is 1.1.1.1 into metadata, and skip to Table3.

Figure 8:
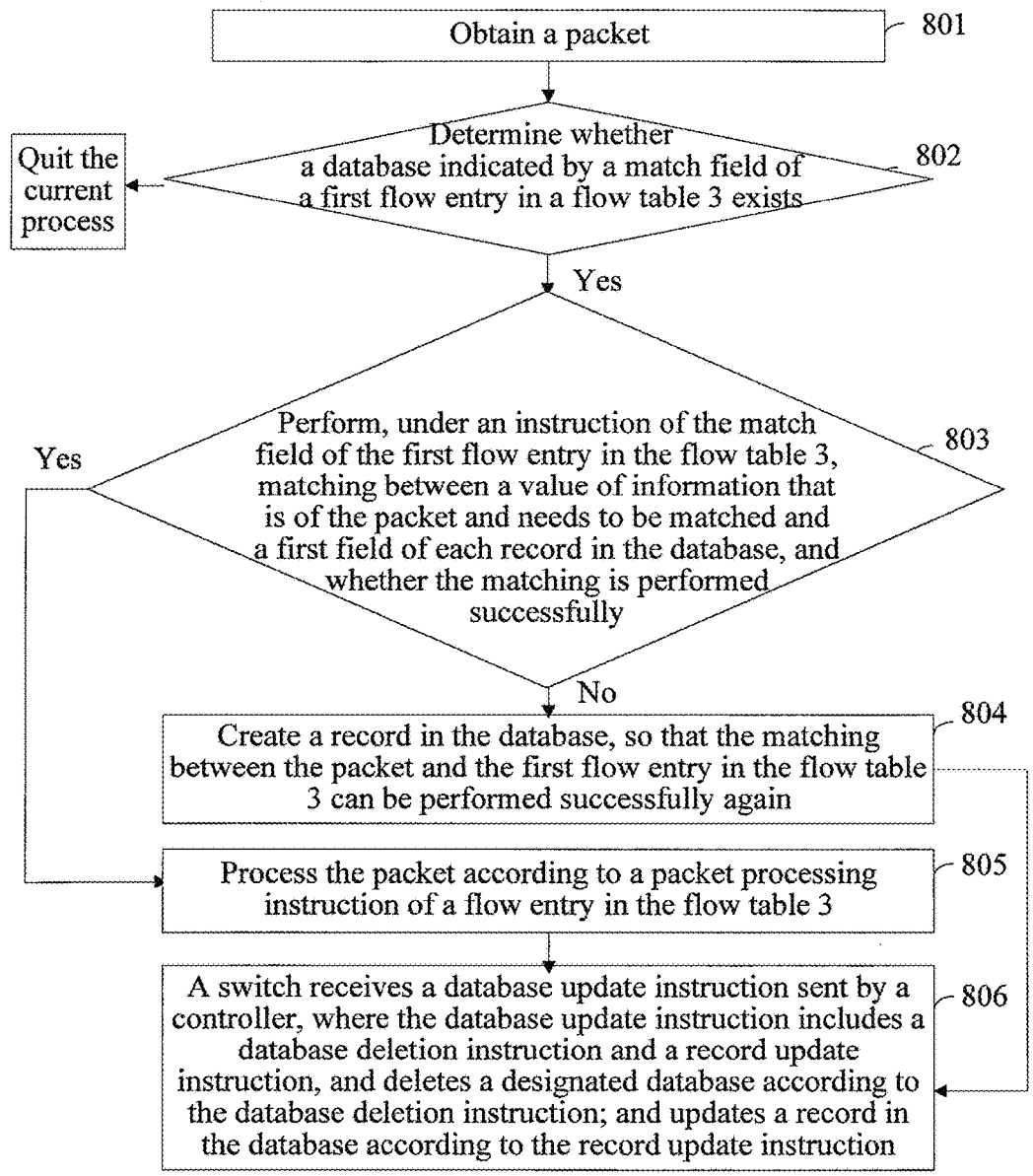

Referring to FIG. 8, a process of the method includes:

Step 801: Obtain a packet.

Specifically, after receiving the packet, a switch sends the packet to Table2 for matching.

Specifically, a flow entry in Table2 is used for instructing to write a GRE tunnel ID of a packet whose destination IP address is 1.1.1.1 into metadata, and skip to Table3.

Step 802: Determine whether a database indicated by a match field of a first flow entry in Table3 exists, and if the database exists, perform step 803; if the database does not exist, quit.

For example, it is assumed that a first flow entry is set in Table3: "Match ((Tunnel-ID=MetaData.GRE-ID), DataBase ID=0), Instructions (Apply-Actions (Push-GRE-Header (MatchRecord.Sequence-Number), Push-IP-Header (MatchRecord.Outer-SRC-IP, MatchRecord.Outer-DST-IP)), UpdateDatabase(MatchRecord.Sequence-Number= (MatchRecord.Sequence-Number+1)mod(2**32))), Goto-Table TableM)".

Specifically, a flow entry in Table3 is used for instructing the switch to perform matching between the GRE tunnel ID in the metadata and a GRE tunnel ID field in a database whose database ID is 1. The switch determines whether the database whose database ID is 1 exists.

Step 803: Perform, under an instruction of the match field of the first flow entry in Table3, matching between a value of information that is of the packet and needs to be matched and a first field of each record in a database.

Specifically, if the database exists, it is queried whether a value of the GRE tunnel ID field in the database is the same as the GRE tunnel ID in the metadata. If the value of the GRE tunnel ID field in the database is the same as the GRE tunnel ID in the metadata, a first record matching the packet is obtained, and step 805 is performed, and if the value of the GRE tunnel ID field in the database is different from the GRE tunnel ID in the metadata, step 804 is performed.

Step 804: Create a record in the database, so that matching between the packet and the first flow entry in Table3 can be performed successfully again.

Specifically, if matching on Table3 fails, the packet may be forwarded to a controller. The controller instructs the switch to add, to the database whose database ID is 1, a record that: a GRE tunnel ID is 1, an outer source IP address is 3.3.3.3, and an outer destination IP address is 4.4.4.4. Because the controller has not designated a sequence number, a default value is used for a sequence number field of the newly added record, that is, 0, and 3.3.3.3 designated herein instead of a default value is used as the outer source IP address.

Step 805: Process the packet according to a packet processing instruction of a flow entry in Table3.

Specifically, if matching on Table3 is performed successfully, an instruction of a flow entry in Table3 instructs to add a GRE header to the packet (a sequence number in the GRE header is set to a value of a sequence number field corresponding to a matching GRE tunnel ID in the database), add an IP header (a source IP address in the IP header is set to an outer source IP address corresponding to the matching GRE tunnel ID in the database, and a destination IP address in the IP header is set to an IP address corresponding to the matching GRE tunnel ID in the database), and perform a modulo operation of $2^{32}$ on a value of the sequence number plus one and then update a modulo operation result to the database, and then skip to TableM (M is a natural number).

Step 806: The switch receives a database update instruction sent by a controller, where the database update instruction includes a database deletion instruction and a record update instruction, and deletes a designated database according to the database deletion instruction, and updates a record in the database according to the record update instruction.

The record update instruction includes adding a record to the database, deleting a record from the database, and modifying a record in the database.

The controller may control, according to service needs and at any time, the switch to alter the database and a record.

It should be noted that, this embodiment of the present invention does not limit an execution sequence of step 806, and step 806 may be performed before or after any step of this embodiment.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 7

This embodiment of the present invention provides a switching device, where the switching device stores one or more flow tables. The device includes:

a first setting module, configured to set a first flow entry in at least one flow table, where the first flow entry includes a match field, and the match field is used for designating information that needs to be matched, and instructing the switching device to perform matching between a value of information that is of a received packet and needs to be matched and a first field of each record in a database.

The information that needs to be matched includes one or more of a packet header field, an ID of an ingress port from which the switching device receives the packet, and metadata associated with the packet. Each record in the database includes the first field, and the first field is used for denoting a designated value of the information that needs to be matched.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 8

Figure 9:
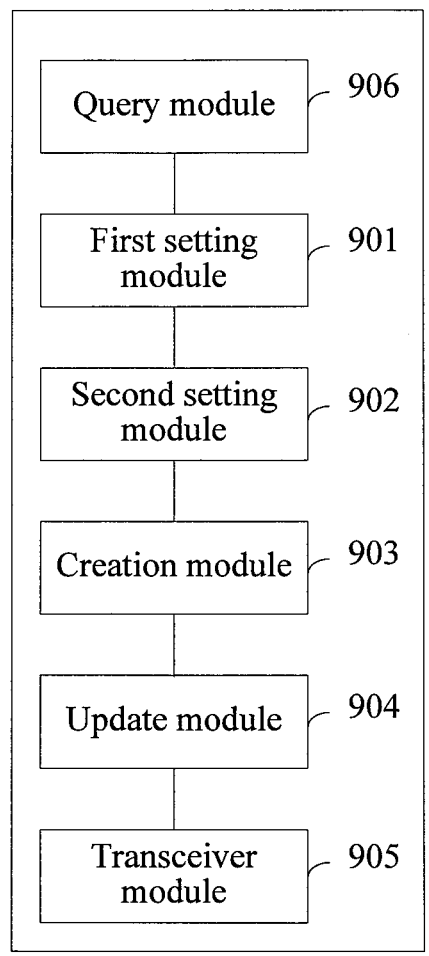
FIG. 9 and FIG. 10 are schematic structural diagrams of a switching device according to an embodiment of the present invention.

This embodiment of the present invention provides a switching device, where the switching device stores one or more flow tables. Referring to FIG. 9, the device includes:

a first setting module 901, configured to set a first flow entry in at least one flow table, where the first flow entry includes a match field, and the match field is used for designating information that needs to be matched, and instructing the switching device to perform matching between a value of information that is of a received packet and needs to be matched and a first field of each record in a database.

The information that needs to be matched includes one or more of a packet header field, an ID of an ingress port from which the switching device receives the packet, and metadata associated with the packet. Each record in the database includes the first field, and the first field is used for denoting a designated value of the information that needs to be matched.

Optionally, the match field is further used for designating an ID of the database, and instructing the switching device to perform matching between the value of the information that is of the received packet and needs to be matched and the first field of each record in the database, whose ID is the ID of the database.

Optionally, each record of the database further includes a second field, and the second field is used for denoting a packet processing parameter.

The first flow entry further includes a packet processing instruction, and the packet processing instruction is used for instructing the switching device to: when a first record matching the packet exists in the database, process the packet according to the packet processing instruction by using a second field in the first record as a parameter.

Optionally, when multiple first records exist in the database, the match field is used for instructing the switching device to perform matching between the value of the information that is of the received packet and needs to be matched and the first field of each record in the database, to obtain a first one of the multiple first records; and the packet processing instruction is used for instructing the switching device to: process the packet according to the packet processing instruction by using a second field of the first one of the first records as a parameter; or the match field is used for instructing the switching device to perform matching between the value of the information that is of the received packet and needs to be matched and the first field of each record in the database, to obtain the multiple first records; and the packet processing instruction is used for instructing the switching device to: separately process multiple packets, which are duplicated by the switching device, according to the packet processing instruction by using a second field of each of the multiple first records as a parameter.

Optionally, the first flow entry further includes a record processing instruction, and the record processing instruction is used for instructing the switching device to: when a first record matching the packet exists in the database, perform an operation on a designated record in a designated database.

Optionally, the record processing instruction includes one or more of the following instructions: a first modification instruction, a second modification instruction, an addition instruction, and a deletion instruction, where the first modification instruction is used for instructing the switching device to: when a first record matching the packet exists in the database, perform calculation on a current value of a first designated field of a first designated record in a first designated database, to obtain an update value of the first designated field and record the update value into the first designated database; the second modification instruction is used for instructing the switching device to: when a first record matching the packet exists in the database, modify a current value of a second designated field of a second designated record in a second designated database into a set value; the addition instruction is used for instructing the switching device to: when a first record matching the packet exists in the database, add a third designated record to a third designated database; and the deletion instruction is used for instructing the switching device to: when a first record matching the packet exists in the database, delete a fourth designated database or a fourth designated record in the fourth designated database.

Optionally, the first flow entry includes a priority, the priority is used for indicating a sequence of matching between the packet and each first flow entry, and the device further includes:

a second setting module 902, configured to set a second flow entry in at least one flow table, where a priority of the second flow entry is lower than that of the first flow entry, the second flow entry universally matches all packets, the second flow entry includes a record addition instruction, and the record addition instruction is used for instructing the switching device to add, according to a packet matching the second flow entry, a record to a designated database.

Optionally, the device further includes:

a creation module 903, configured to receive a configuration command delivered by an operator, and create the database according to the configuration command; or receive a database creation instruction sent by a controller, and establish the database according to the database creation instruction, where the database creation instruction includes a database ID and database field information.

Optionally, the database creation instruction further includes at least one of database attribute information and statistical information; the database attribute information includes a maximum quantity of records in the database, a timeout of a record in the database, and whether to allow the switching device to alter a record in the database; and the statistical information includes a total quantity of records in the database, a total quantity of matching between the database and packets, a total quantity of times of successful matching, and a total quantity of times of successful matching of each record.

Optionally, the device further includes:

an update module 904, configured to receive a database update instruction sent by the controller, and update the database according to the database update instruction, where the database update instruction includes at least one of a database deletion instruction and a record update instruction, and the record update instruction includes adding a record to the database, deleting a record from the database, and modifying a record in the database.

Optionally, the device further includes:

a transceiver module 905, configured to receive a query message sent by the controller, and send a response message to the controller, where the response message is corresponding to the query message, and the query message is used for querying one or more of attribute information of the database, content of a record in the database, and statistical information of the database.

Optionally, the device further includes:

a query module 906, configured to query whether the database exists, and when the database exists, set the first flow entry in at least one flow table; and when the database does not exist, report, to the controller, a message denoting that the database does not exist.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 9

Figure 10:
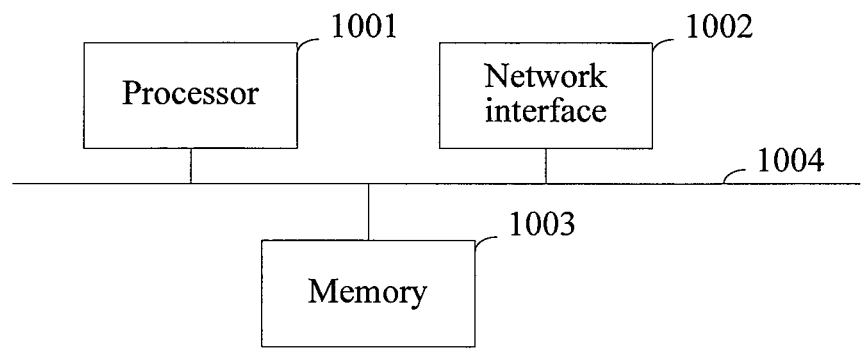

This embodiment of the present invention provides a switching device. Referring to FIG. 10, the switching device may be a server. The server generally includes at least one processor 1001 (such as a CPU), at least one network interface 1002 or another communications interface, a memory 1003, and at least one communications bus 1004. A person skilled in the art can understand that, a structure of the server shown in FIG. 10 does not constitute a limitation on the switching device, and may include more or fewer components than those shown in the figure, or a combination of some components, or different component arrangements.

The following describes components of the switching device in detail with reference to FIG. 10.

The communications bus 1004 is configured to implement connection and communication among the processor 1001, the memory 1003, and the network interface 1002.

The at least one network interface 1002 (which may be wired or wireless) implements communication and connection between the switching device and at least two other computers (such as hosts) and between the switching device and at least one server (such as a controller) separately (the computers and the server may share a network interface 1002 and are separately connected to the switching device), and the Internet, a wide area network, a local network, a metropolitan area network, or the like may be used.

The memory 1003 may be configured to store a software program and an application module, and the processor 1001 executes various function applications and data processing of the switching device by running the software program and the application module stored in the memory 1003. The memory 1003 may mainly include a program storage area and a data storage area, where the program storage area may store an operating system, an application program required by at least one function (such as a matching function and an instruction execution function of a flow entry of a flow table), and the like; and the data storage area may store data (such as a flow table and a database that are stored) that is created according to the use of the switching device, and the like. In addition, the memory 1003 may include a high-speed RAM (Random Access Memory, random access memory), and may also include a non-volatile memory (non-volatile memory), for example, at least one disk storage device, flash memory device, or another volatile solid-state storage device.

The processor 1001 is a control center of the switching device, is connected to parts of the entire switching device by using various interfaces and lines, and executes various functions of the switching device and processes data by running or executing the software program and/or application module stored in the memory 1003, and invoking data stored in the memory 1003, thereby performing overall monitoring on the switching device.

Specifically, by running or executing the software program and/or application module stored in the memory 1003, and invoking the data stored in the memory 1003, the processor 1001 may implement: setting a first flow entry in at least one flow table, where the first flow entry includes a match field, and the match field is used for designating information that needs to be matched, and instructing the switching device to perform matching between a value of information that is of a received packet and needs to be matched and a first field of each record in a database. The information that needs to be matched includes one or more of a packet header field, an ID of an ingress port from which the switching device receives the packet, and metadata associated with the packet. Each record in the database includes the first field, and the first field is used for denoting a designated value of the information that needs to be matched.

Preferably, the match field is further used for designating an ID of the database, and instructing the switching device to perform matching between the value of the information that is of the received packet and needs to be matched and the first field of each record in the database, whose ID is the ID of the database.

Preferably, each record of the database further includes a second field, and the second field is used for denoting a packet processing parameter; and the first flow entry further includes a packet processing instruction, and the packet processing instruction is used for instructing the switching device to: when a first record matching the packet exists in the database, process the packet according to the packet processing instruction by using a second field in the first record as a parameter.

Preferably, when multiple first records exist in the database, the match field is used for instructing the switching device to perform matching between the value of the information that is of the received packet and needs to be matched and the first field of each record in the database, to obtain a first one of the multiple first records; and the packet processing instruction is used for instructing the switching device to: process the packet according to the packet processing instruction by using a second field of the first one of the first records as a parameter; or the match field is used for instructing the switching device to perform matching between the value of the information that is of the received packet and needs to be matched and the first field of each record in the database, to obtain the multiple first records; and the packet processing instruction is used for instructing the switching device to: process multiple packets, which are duplicated by the switching device, according to the packet processing instruction by using a second field of each of the multiple first records as a parameter.

Preferably, the first flow entry further includes a record processing instruction, and the record processing instruction is used for instructing the switching device to: when a first record matching the packet exists in the database, perform an operation on a designated record in a designated database.

Optionally, the record processing instruction includes one or more of the following instructions: a first modification instruction, a second modification instruction, an addition instruction, and a deletion instruction, where the first modification instruction is used for instructing the switching device to: when a first record matching the packet exists in the database, perform calculation on a current value of a first designated field of a first designated record in a first designated database, to obtain an update value of the first designated field and record the update value into the first designated database; the second modification instruction is used for instructing the switching device to: when a first record matching the packet exists in the database, modify a current value of a second designated field of a second designated record in a second designated database into a set value; the addition instruction is used for instructing the switching device to: when a first record matching the packet exists in the database, add a third designated record to a third designated database; and the deletion instruction is used for instructing the switching device to: when a first record matching the packet exists in the database, delete a fourth designated database or a fourth designated record in the fourth designated database.

Optionally, the first flow entry includes a priority, the priority is used for indicating a sequence of matching between the packet and each first flow entry, and the processor 1001 may implement: setting a second flow entry in at least one flow table, where a priority of the second flow entry is lower than that of the first flow entry, the second flow entry universally matches all packets, the second flow entry includes a record addition instruction, and the record addition instruction is used for instructing the switching device to add, according to a packet matching the second flow entry, a record to a designated database.

Optionally, the network interface 1002 may implement: receiving a configuration command delivered by an operator, or receiving a database creation instruction sent by a controller, where the database creation instruction includes a database ID and database field information.

Optionally, the processor 1001 may implement: creating the database according to the configuration command; or establishing the database according to the database creation instruction.

Preferably, the database creation instruction further includes at least one of database attribute information and statistical information; the database attribute information includes a maximum quantity of records in the database, a timeout of a record in the database, and whether to allow the switching device to alter a record in the database; and the statistical information includes a total quantity of records in the database, a total quantity of matching between the database and packets, a total quantity of times of successful matching, and a total quantity of times of successful matching of each record.

Optionally, the network interface 1002 may implement: receiving a database update instruction sent by the controller, where the database update instruction includes a database deletion instruction and a record update instruction, and the record update instruction includes adding a record to the database, deleting a record from the database, and modifying a record in the database; and the processor 1001 may implement: updating the database according to the database deletion instruction.

Optionally, the network interface 1002 may implement: receiving a query message sent by the controller, where the query message is used for querying one or more of attribute information of the database, content of a record in the database, and statistical information of the database; and the processor 1001 may implement: sending a response message to the controller, where the response message is corresponding to the query message.

Optionally, the processor 1001 may implement: querying whether the database exists, and when the database exists, setting the first flow entry in at least one flow table; and when the database does not exist, reporting, to the controller, a message denoting that the database does not exist.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 10

This embodiment of the present invention provides a controller, where the controller includes:

a first sending module, configured to send a first flow entry installation message, where the first flow entry installation message includes a flow table ID and a first flow entry; the first flow entry installation message is used for instructing the switching device to set the first flow entry in a flow table corresponding to the flow table ID; the first flow entry includes a match field, and the match field is used for designating information that needs to be matched, and instructing the switching device to perform matching between information that is of a received packet and needs to be matched and a first field of each record in a database.

The information that needs to be matched includes one or more of a packet header field, an ID of an ingress port from which the switching device receives the packet, and metadata associated with the packet. Each record in the database includes the first field, and the first field is used for denoting a designated value of the information that needs to be matched.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 11

Figure 11:
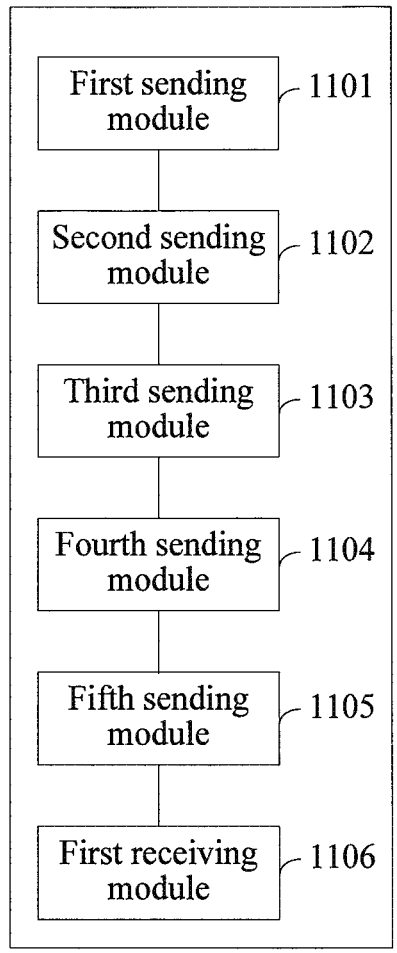
FIG. 11 and FIG. 12 are schematic structural diagrams of a controller according to an embodiment of the present invention.

This embodiment of the present invention provides a controller. Referring to FIG. 11, the controller includes:

a first sending module 1101, configured to send a first flow entry installation message, where the first flow entry installation message includes a flow table ID and a first flow entry; the first flow entry installation message is used for instructing the switching device to set the first flow entry in a flow table corresponding to the flow table ID; the first flow entry includes a match field, and the match field is used for designating information that needs to be matched, and instructing the switching device to perform matching between information that is of a received packet and needs to be matched and a first field of each record in a database.

The information that needs to be matched includes one or more of a packet header field, an ID of an ingress port from which the switching device receives the packet, and metadata associated with the packet. Each record in the database includes the first field, and the first field is used for denoting a designated value of the information that needs to be matched.

Optionally, the match field is further used for designating an ID of the database, and instructing the switching device to perform matching between the value of the information that is of the received packet and needs to be matched and the first field of each record in the database, whose ID is the ID of the database.

Optionally, each record of the database further includes a second field, and the second field is used for denoting a packet processing parameter; and the first flow entry further includes a packet processing instruction, and the packet processing instruction is used for instructing the switching device to: when a first record matching the packet exists in the database, process the packet according to the packet processing instruction by using a second field in the first record as a parameter.

Optionally, when multiple first records exist in the database, the match field is used for instructing the switching device to perform matching between the value of the information that is of the received packet and needs to be matched and the first field of each record in the database, to obtain a first one of the multiple first records; and the packet processing instruction is used for instructing the switching device to: process the packet according to the packet processing instruction by using a second field of the first one of the first records as a parameter; or the match field is used for instructing the switching device to perform matching between the value of the information that is of the received packet and needs to be matched and the first field of each record in the database, to obtain the multiple first records; and the packet processing instruction is used for instructing the switching device to: separately process multiple packets, which are duplicated by the switching device, according to the packet processing instruction by using a second field of each of the multiple first records as a parameter.

Optionally, the first flow entry further includes a record processing instruction, and the record processing instruction is used for instructing the switching device to: when a first record matching the packet exists in the database, perform an operation on a designated record in a designated database.

Optionally, the record processing instruction includes one or more of the following instructions: a first modification instruction, a second modification instruction, an addition instruction, and a deletion instruction, where the first modification instruction is used for instructing the switching device to: when a first record matching the packet exists in the database, perform calculation on a current value of a first designated field of a first designated record in a first designated database, to obtain an update value of the first designated field and record the update value into the first designated database;

the second modification instruction is used for instructing the switching device to: when a first record matching the packet exists in the data, modify a current value of a second designated field of a second designated record in a second designated database into a set value;

the addition instruction is used for instructing the switching device to: when a first record matching the packet exists in the database, add a third designated record to a third designated database; and the deletion instruction is used for instructing the switching device to: when a first record matching the packet exists in the database, delete a fourth designated database or a fourth designated record in the fourth designated database.

Optionally, the first flow entry includes a priority, the priority is used for indicating a sequence of matching between the packet and each first flow entry, and the controller further includes:

a second sending module 1102, configured to send second flow entry installation message, where the second flow entry installation message includes a flow table ID and a second flow entry, a priority of the second flow entry is lower than that of the first flow entry, the second flow entry universally matches all packets, the second flow entry includes a record addition instruction, and the record addition instruction is used for instructing the switching device to add, according to a packet matching the second flow entry, a record to a designated database.

Optionally, the controller further includes:

a third sending module 1103, configured to send a database creation instruction to the switching device, where the database creation instruction is used for instructing the switching device to create a database, and the database creation instruction includes a database ID and database field information.

Optionally, the database creation instruction further includes at least one of database attribute information and statistical information; the database attribute information includes a maximum quantity of records in the database, a timeout of a record in the database, and whether to allow the switching device to alter a record in the database; and the statistical information includes a total quantity of records in the database, a total quantity of matching between the database and packets, a total quantity of times of successful matching, and a total quantity of times of successful matching of each record.

Optionally, the controller further includes:

a fourth sending module 1104, configured to send a database update instruction to the switching device, where the database update instruction includes at least one of a database deletion instruction and a record update instruction, and the record update instruction includes adding a record to the database, deleting a record from the database, and modifying a record in the database.

Optionally, the controller further includes:

a fifth sending module 1105, configured to send a query message to the switching device, where the query message is used for querying one or more of attribute information of the database, content of a record in the database, and statistical information of the database.

Optionally, the controller further includes:

a first receiving module 1106, configured to receive a message returned by the switching device and denoting that the database does not exist.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 12

Figure 12:
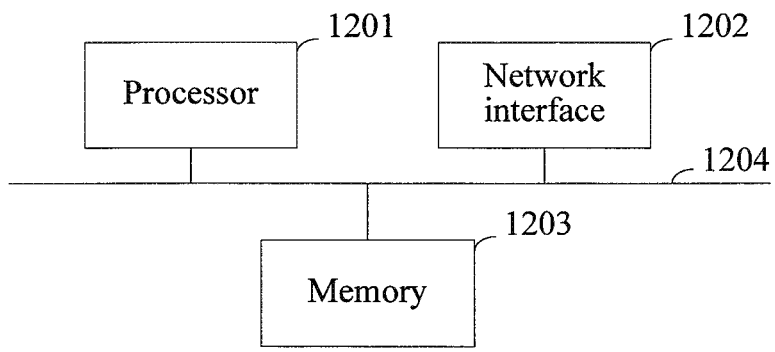

This embodiment of the present invention provides a controller. Referring to FIG. 12, the controller may be a server. The server generally includes at least one processor 1201 (such as a CPU), at least one network interface 1202 or another communications interface, a memory 1203, and at least one communications bus 1204. A person skilled in the art can understand that, a structure of the server shown in FIG. 12 does not constitute a limitation on the controller, and may include more or fewer components than those shown in the figure, or a combination of some components, or different component arrangements.

The following describes components of the controller in detail with reference to FIG. 12.

The communications bus 1204 is configured to implement connection and communication among the processor 1201, the memory 1203, and the network interface 1202.

The at least one network interface 1202 (which may be wired or wireless) implements communication and connection between the controller and at least one server (such as a switching device), and the Internet, a wide area network, a local network, a metropolitan area network, or the like may be used.

The memory 1203 may be configured to store a software program and an application module, and the processor 1201 executes various function applications and data processing of the controller by running the software program and the application module stored in the memory 1203. The memory 1203 may mainly include a program storage area and a data storage area, where the program storage area may store an operating system, an application program required by at least one function (such as delivering a flow entry), and the like; and the data storage area may store data (such as a stored packet) that is created according to the use of the controller, and the like. In addition, the memory 1203 may include a high-speed RAM (Random Access Memory, random access memory), and may also include a non-volatile memory (non-volatile memory), for example, at least one disk storage device, flash memory device, or another volatile solid-state storage device.

The processor 1201 is a control center of the controller, is connected to parts of the entire controller by using various interfaces and lines, and executes various functions of the controller and processes data by running or executing the software program and/or application module stored in the memory 1203, and invoking data stored in the memory 1203, thereby performing overall monitoring on the controller.

Specifically, by running or executing the software program and/or application module stored in the memory 1203, and invoking the data stored in the memory 1203, the processor 1201 may implement: sending a first flow entry installation message, where the first flow entry installation message includes a flow table ID and a first flow entry; the first flow entry installation message is used for instructing the switching device to set the first flow entry in a flow table corresponding to the flow table ID; the first flow entry includes a match field, and the match field is used for designating information that needs to be matched, and instructing the switching device to perform matching between information that is of a received packet and needs to be matched and a first field of each record in a database. The information that needs to be matched includes one or more of a packet header field, an ID of an ingress port from which the switching device receives the packet, and metadata associated with the packet. Each record in the database includes the first field, and the first field is used for denoting a designated value of the information that needs to be matched.

Optionally, the match field is further used for designating an ID of the database, and instructing the switching device to perform matching between the value of the information that is of the received packet and needs to be matched and the first field of each record in the database, whose ID is the ID of the database.

Optionally, each record of the database further includes a second field, and the second field is used for denoting a packet processing parameter; and the first flow entry further includes a packet processing instruction, and the packet processing instruction is used for instructing the switching device to: when a first record matching the packet exists in the database, process the packet according to the packet processing instruction by using a second field in the first record as a parameter.

Optionally, when multiple first records exist in the database, the match field is used for instructing the switching device to perform matching between the value of the information that is of the received packet and needs to be matched and the first field of each record in the database, to obtain a first one of the multiple first records; and the packet processing instruction is used for instructing the switching device to: process the packet according to the packet processing instruction by using a second field of the first one of the first records as a parameter; or the match field is used for instructing the switching device to perform matching between the value of the information that is of the received packet and needs to be matched and the first field of each record in the database, to obtain the multiple first records; and the packet processing instruction is used for instructing the switching device to: separately process multiple packets, which are duplicated by the switching device, according to the packet processing instruction by using a second field of each of the multiple first records as a parameter.

Optionally, the first flow entry further includes a record processing instruction, and the record processing instruction is used for instructing the switching device to: when a first record matching the packet exists in the database, perform an operation on a designated record in a designated database.

Preferably, the record processing instruction includes one or more of the following instructions: a first modification instruction, a second modification instruction, an addition instruction, and a deletion instruction, where the first modification instruction is used for instructing the switching device to: when a first record matching the packet exists in the database, perform calculation on a current value of a first designated field of a first designated record in a first designated database, to obtain an update value of the first designated field and record the update value into the first designated database; the second modification instruction is used for instructing the switching device to: when a first record matching the packet exists in the database, modify a current value of a second designated field of a second designated record in a second designated database into a set value; the addition instruction is used for instructing the switching device to: when a first record matching the packet exists in the database, add a third designated record to a third designated database; and the deletion instruction is used for instructing the switching device to: when a first record matching the packet exists in the database, delete a fourth designated database or a fourth designated record in the fourth designated database.

Optionally, the first flow entry includes a priority, the priority is used for indicating a sequence of matching between the packet and each first flow entry, and the processor 1201 may implement: sending second flow entry installation message, where the second flow entry installation message includes a flow table ID and a second flow entry, a priority of the second flow entry is lower than that of the first flow entry, the second flow entry universally matches all packets, the second flow entry includes a record addition instruction, and the record addition instruction is used for instructing the switching device to add, according to a packet matching the second flow entry, a record to a designated database.

Optionally, the processor 1201 may implement: sending a database creation instruction to the switching device, where the database creation instruction is used for instructing the switching device to create a database, and the database creation instruction includes a database ID and database field information.

Optionally, the processor 1201 may implement: the database creation instruction further includes at least one of database attribute information and statistical information; the database attribute information includes a maximum quantity of records in the database, a timeout of a record in the database, and whether to allow the switching device to alter a record in the database; and the statistical information includes a total quantity of records in the database, a total quantity of matching between the database and packets, a total quantity of times of successful matching, and a total quantity of times of successful matching of each record.

Optionally, the processor 1201 may implement: sending a database update instruction to the switching device, where the database update instruction includes at least one of a database deletion instruction and a record update instruction, and the record update instruction includes adding a record to the database, deleting a record from the database, and modifying a record in the database.

Optionally, the processor 1201 may implement: sending a query message to the switching device, where the query message is used for querying one or more of attribute information of the database, content of a record in the database, and statistical information of the database.

Optionally, the network interface 1202 is configured to receive a message returned by the switching device and denoting that the database does not exist.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 13

Figure 13:
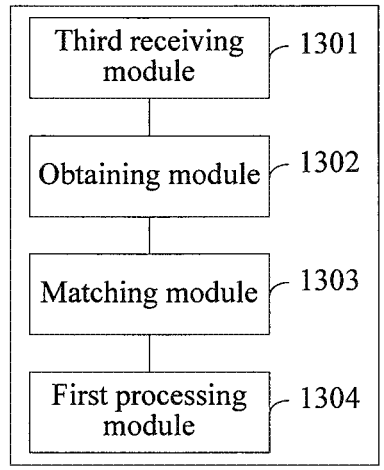
FIG. 13 and FIG. 14 are schematic structural diagrams of another switching device according to an embodiment of the present invention.

This embodiment of the present invention provides a switching device applicable to a method for processing a packet provided in Embodiment 3 of the present invention. Referring to FIG. 13, the device includes:

a third receiving module 1301, configured to receive a packet;

an obtaining module 1302, configured to obtain, according to a match field of a first flow entry in a flow table that the packet needs to match, a value of information that is of the packet and needs to be matched, where the first flow entry includes the match field and a packet processing instruction, and the match field is used for designating information that needs to be matched; and the information that needs to be matched includes one or more of a packet header field, an ID of an ingress port from which the switching device receives the packet, and metadata associated with the packet;

a matching module 1303, configured to perform, under an instruction of the match field, matching between the value of the information that is of the packet and needs to be matched and a first field of each record in a database, where the first field is used for denoting a designated value of the information that needs to be matched; and a first processing module 1304, configured to process the packet according to the packet processing instruction when a first record matching the packet is obtained.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 14

Figure 14:
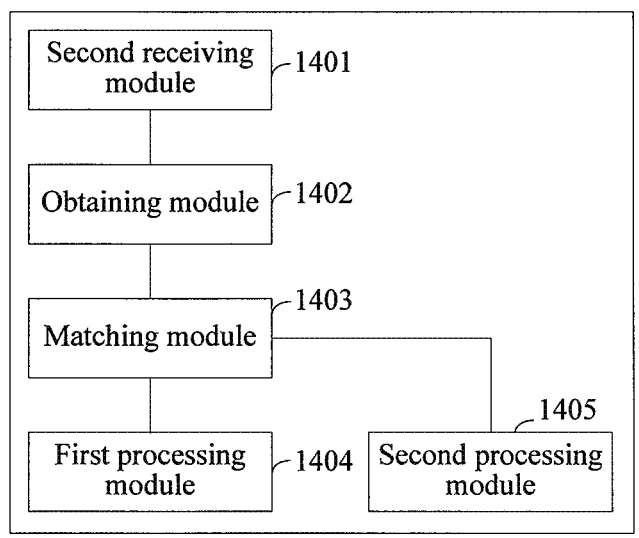

This embodiment of the present invention provides a switching device applicable to a method for processing a packet provided in Embodiments 3 to 6 of the present invention. Referring to FIG. 14, the device includes:

a second receiving module 1401, configured to receive a packet;

an obtaining module 1402, configured to obtain, according to a match field of a first flow entry in a flow table that the packet needs to match, a value of information that is of the packet and needs to be matched, where the first flow entry includes the match field and a packet processing instruction, and the match field is used for designating information that needs to be matched; and the information that needs to be matched includes one or more of a packet header field, an ID of an ingress port from which the switching device receives the packet, and metadata associated with the packet;

a matching module 1403, configured to perform, under an instruction of the match field, matching between the value of the information that is of the packet and needs to be matched and a first field of each record in a database, where the first field is used for denoting a designated value of the information that needs to be matched; and a first processing module 1404, configured to process the packet according to the packet processing instruction when a first record matching the packet is obtained.

Optionally, the first processing module 1404 is configured to process the packet according to the packet processing instruction by using a second field in the first record as a parameter, where the second field is used for denoting a packet processing parameter.

Optionally, when multiple first records exist in the database, the first processing module 1404 is configured to:

process the packet according to the packet processing instruction by using a second field of a first one of the first records as a parameter; or duplicate the packet to obtain multiple packets, and process the multiple packets according to the packet processing instruction by using a second field of each of the multiple first records as a parameter.

Optionally, the first flow entry further includes a record processing instruction, and the first processing module 1404 is further configured to perform an operation on a designated in a designated database under an instruction of the record processing instruction.

Preferably, the record processing instruction includes one or more of the following instructions: a first modification instruction, a second modification instruction, an addition instruction, and a deletion instruction, where the first processing module 1404 is configured to:

after the first record matching the packet is obtained, perform calculation on a current value of a first designated field of a first designated record in a first designated database according to the first modification instruction, to obtain an update value of the first designated field and record the update value into the first designated database; after the first record matching the packet is obtained, modify a current value of a second designated field of a second designated record in a second designated database into a set value according to the second modification instruction; after the first record matching the packet is obtained, add a third designated record to a third designated database according to the addition instruction; and/or after the first record matching the packet is obtained, delete a fourth designated database or a fourth designated record in the fourth designated database according to the deletion instruction.

Optionally, the first flow entry includes a priority, the priority is used for indicating a sequence of matching between the packet and each first flow entry, a second flow entry is further set in the flow table, a priority of the second flow entry is lower than that of the first flow entry, the second flow entry universally matches all packets, the second flow entry includes a record addition instruction, and the device further includes:

a second processing module 1405, configured to: when a record matching the packet does not exist in the database, perform matching between the packet and the second flow entry and perform the matching successfully, and add a record to a designated database according to the packet under an instruction of the record addition instruction.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 15

This embodiment of the present invention provides a switching device applicable to a method for processing a packet provided in Embodiments 3 to 6 of the present invention. The switching device may be a server. The server generally includes at least one processor (such as a CPU), at least one network interface or another communications interface, a memory, and at least one communications bus.

The processor, the network interface, the memory, and the communications bus are the same as the processor 1001, the network interface 1002, the memory 1003, and the communications bus 1004 (referring to FIG. 10) of the switching device provided in Embodiment 9, and description thereof is omitted herein.

Specifically, by running or executing a software program and/or an application module stored in the memory, and invoking data stored in the memory, the processor may implement: receiving a packet; obtaining, according to a match field of a first flow entry in a flow table that the packet needs to match, a value of information that is of the packet and needs to be matched, where the first flow entry includes the match field and a packet processing instruction, and the match field is used for designating information that needs to be matched; and the information that needs to be matched includes one or more of a packet header field, an ID of an ingress port from which the switching device receives the packet, and metadata associated with the packet; performing, under an instruction of the match field, matching between the value of the information that is of the packet and needs to be matched and a first field of each record in a database; and processing the packet according to the packet processing instruction when a first record matching the packet is obtained, where the first field is used for denoting a designated value of information that needs to be matched.

Optionally, the processor may implement: processing the packet according to the packet processing instruction by using a second field in the first record as a parameter, where the second field is used for denoting a packet processing parameter.

Optionally, when multiple first records exist in the database, the processor may implement: processing the packet according to the packet processing instruction by using a second field of a first one of the first records as a parameter; or duplicating the packet to obtain multiple packets, and processing the multiple packets according to the packet processing instruction by using a second field of each of the multiple first records as a parameter.

Optionally, the processor may implement: performing an operation on a designated in a designated database under an instruction of the record processing instruction.

Preferably, the record processing instruction includes one or more of the following instructions: a first modification instruction, a second modification instruction, an addition instruction, and a deletion instruction, where the processor may implement: after the first record matching the packet is obtained, performing calculation on a current value of a first designated field of a first designated record in a first designated database according to the first modification instruction, to obtain an update value of the first designated field and record the update value into the first designated database; after the first record matching the packet is obtained, modifying a current value of a second designated field of a second designated record in a second designated database into a set value according to the second modification instruction; after the first record matching the packet is obtained, adding a third designated record to a third designated database according to the addition instruction; and/or after the first record matching the packet is obtained, deleting a fourth designated database or a fourth designated record in the fourth designated database according to the deletion instruction.

Optionally, the first flow entry includes a priority, the priority is used for indicating a sequence of matching between the packet and each first flow entry, a second flow entry is further set in the flow table, a priority of the second flow entry is lower than that of the first flow entry, the second flow entry universally matches all packets, the second flow entry includes a record addition instruction, and the processor may implement: when a record matching the packet does not exist in the database, performing matching between the packet and the second flow entry and performing the matching successfully, and adding a record to a designated database according to the packet under an instruction of the record addition instruction.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

Embodiment 16

Figure 15:
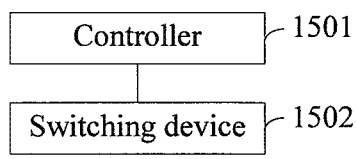
FIG. 15 is a schematic structural diagram of a system for processing a packet according to an embodiment of the present invention.

This embodiment of the present invention provides a system for processing a packet. Referring to FIG. 15, the system includes a controller 1501 and a switching device 1502.

Specifically, the controller 1501 may be a controller described in Embodiments 10 to 12 of the present invention, the switching device 1502 may be a switching device described in Embodiments 7, 8, 9, 13, 14, and 15 of the present invention, and description thereof is omitted herein.

In this embodiment of the present invention, a (designated) value that is designated by a match field of a flow entry in a flow table and is of information that needs to be matched is stored by using a field of a record in a database, the database includes many records, a record also includes many fields, and the many fields may store a large quantity of values that are designated by match fields and are of information that needs to be matched. In this way, all values that are designated by match fields and are of information that needs to be matched are different, and flow entries whose instructions are the same may be simplified into one flow entry, thereby reducing a quantity of flow entries, and eliminating redundant information existing in the flow entries; and when a value that is designated by a match field and is of information that needs to be matched does not exist in the database, an addition operation needs to be performed only once, so as to add the value of the information that needs to be matched to the database, and an additional information update operation does not need to be performed, thereby avoiding the chance of error.

It should be noted that when the switching device provided in the embodiment processes a packet, description is only made by using division of the functional modules as an example. In actual application, the functions may be assigned, according to needs, to be implemented by different functional modules, that is, an internal structure of the switching device is divided into different functional modules, so as to implement all or a part of the functions described above. Furthermore, the switching device embodiment provided by the embodiments belongs to the same idea as the packet processing method embodiment, and the method embodiment may serve as a reference for details of a specific implementation process thereof, and details are not described herein again.

The sequence numbers of the foregoing embodiments of the present invention are merely for the purpose of description, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, and improvement made without departing from the principle of the present invention shall fall within the protection scope of the present invention.

What is claimed is:

1. A method for configuring a switching device, wherein one or more flow tables are set in the switching device in an openflow system, the method comprising:

setting, by the switching device, a first flow entry in at least one of the flow tables,
wherein the first flow entry comprises a match field used for designating information that needs to be matched and instructing the switching device to perform matching between a value of information that is of a received packet and needs to be matched and a first field of each record in a database, wherein each record of the database further comprises a second field used for denoting a packet processing parameter, and the first flow entry also comprises a record processing instruction used for instructing the switching device to, when a first record matching the packet exists in the database, process the packet according to the packet processing instruction by using a second field in the first record as a parameter, wherein the database is distinct from the one or more flow tables and includes a database ID, and the records in the database do not include instructions, wherein the information that needs to be matched comprises one or more of a packet header field, an identity of an ingress port from which the switching device receives the packet, and metadata associated with the packet, and wherein each record in the database comprises the first field, and the first field is used for denoting a designated value of the information that needs to be matched;

performing, by the switching device, according to the first flow entry, matching between the value of information that is of a received packet and needs to be matched and the first field of each record in a database; and performing an operation on a designated record in a designated database under an instruction of the record processing instruction, wherein the record processing instruction comprises one or more of the following instructions: a first modification instruction, a second modification instruction, an addition instruction, and a deletion instruction, by:

after the first record matching the packet is obtained, performing calculation on a current value of a first designated field of a first designated record in a first designated database according to the first modification instruction, to obtain an update value of the first designated field and record the update value into the first designated database, after the first record matching the packet is obtained, modifying a current value of a second designated field of a second designated record in a second designated database into a set value according to the second modification instruction, after the first record matching the packet is obtained, adding a third designated record to a third designated database according to the addition instruction, and/or after the first record matching the packet is obtained, deleting a fourth designated database or a fourth designated record in the fourth designated database according to the deletion instruction.

2. The method according to claim 1, wherein the match field is further used for designating an identity of the database and instructing the switching device to perform matching between the value of the information that is of the received packet and needs to be matched and the first field of each record in the database, whose identity is the identity of the database.

3. The method according to claim 1, wherein when multiple first records exist in the database, the match field is used for instructing the switching device to perform matching between the value of the information that is of the received packet and needs to be matched and the first field of each record in the database, to obtain a first one of the multiple first records, and the packet processing instruction is used for instructing the switching device to: process the packet according to the packet processing instruction by using the second field of the first one of the first records as the parameter.

4. The method according to claim 1, wherein when multiple first records exist in the database, the match field is used for instructing the switching device to perform matching between the value of the information that is of the received packet and needs to be matched and the first field of each record in the database, to obtain the multiple first records, and the packet processing instruction is used for instructing the switching device to: separately process multiple packets, which are duplicated by the switching device, according to the packet processing instruction by using the second field of each of the multiple first records as the parameter.

5. A method for processing a packet at a switching device in an openflow system, the method comprising:

receiving a packet;

obtaining, according to a match field of a first flow entry in a flow table that the packet needs to match, a value of information that is of the packet and needs to be matched, wherein the first flow entry comprises the match field and a packet processing instruction used for instructing the switching device to, when a first record matching the packet exists in the database, process the packet according to the packet processing instruction by using a second field in the first record as a parameter, and the match field is used for designating information that needs to be matched which comprises one or more of a packet header field, an identity of an ingress port from which the switching device receives the packet, and metadata associated with the packet;

performing, under an instruction of the match field, matching between the value of the information that is of the packet and needs to be matched and a first field of each record in a database, wherein the first field is used for denoting a designated value of the information that needs to be matched, wherein the database is distinct from the flow table and includes a database ID, wherein each record of the database further comprises a second field used for denoting a packet processing parameter and the records in the database do not include instructions; and processing the packet according to the packet processing instruction when a first record matching the packet is obtained, wherein the record processing instruction comprises one or more of the following instructions: a first modification instruction, a second modification instruction, an addition instruction, and a deletion instruction, by:

after the first record matching the packet is obtained, performing calculation on a current value of a first designated field of a first designated record in a first designated database according to the first modification instruction, to obtain an update value of the first designated field and record the update value into the first designated database, after the first record matching the packet is obtained, modifying a current value of a second designated field of a second designated record in a second designated database into a set value according to the second modification instruction, after the first record matching the packet is obtained, adding a third designated record to a third designated database according to the addition instruction, and/or after the first record matching the packet is obtained, deleting a fourth designated database or a fourth designated record in the fourth designated database according to the deletion instruction.

6. The method according to claim 5, wherein processing the packet according to the packet processing instruction further comprises:

processing the packet according to the packet processing instruction by using the second field in the first record as the parameter.

7. The method according to claim 5, wherein when multiple first records exist in the database, processing the packet according to the packet processing instruction by using a second field in the first record as a parameter, wherein the second field is used for denoting a packet processing parameter comprises:

processing the packet according to the packet processing instruction by using the second field in a first one of the first records as the parameter; or duplicating the packet to obtain multiple packets, and processing the multiple packets according to the packet processing instruction by using the second field of each of the multiple first records as the parameter.

8. A switching device in an openflow system, the switching device comprising:

a processor and an interface, wherein the processor is configured to:
set a first flow entry in at least one of one or more flow tables,
wherein the first flow entry comprises a match field, wherein the match field is used for designating information that needs to be matched and instructing the switching device to perform matching between a value of information that is of a received packet and needs to be matched and a first field of each record in a database, wherein each record of the database further comprises a second field used for denoting a packet processing parameter, and the first flow entry also comprises a record processing instruction used for instructing the switching device to, when a first record matching the packet exists in the database, process the packet according to the packet processing instruction by using a second field in the first record as a parameter,
wherein the database is distinct from the one or more flow tables and includes a database ID, and the records in the database do not include instructions,
wherein the information that needs to be matched comprises one or more of a packet header field, an identity of an ingress port from which the switching device receives the packet, and metadata associated with the packet, and
wherein each record in the database comprises the first field, and the first field is used for denoting a designated value of the information that needs to be matched;
perform, according to the first flow entry, matching between the value of information that is of a received packet and needs to be matched and the first field of each record in a database; and
perform an operation on a designated record in a designated database under an instruction of the record processing instruction, wherein the record processing instruction comprises one or more of the following instructions: a first modification instruction, a second modification instruction, an addition instruction, and a deletion instruction, by:

after the first record matching the packet is obtained, performing calculation on a current value of a first designated field of a first designated record in a first designated database according to the first modification instruction, to obtain an update value of the first designated field and record the update value into the first designated database, after the first record matching the packet is obtained, modifying a current value of a second designated field of a second designated record in a second designated database into a set value according to the second modification instruction, after the first record matching the packet is obtained, adding a third designated record to a third designated database according to the addition instruction, and/or after the first record matching the packet is obtained, deleting a fourth designated database or a fourth designated record in the fourth designated database according to the deletion instruction.

9. The device according to claim 8, wherein the processor is configured to:
when a first record matching the packet exists in the database, process the packet according to the packet processing instruction by using the second field in the first record as the parameter.

10. The device according to claim 8, wherein when multiple first records exist in the database, the match field is used for instructing the switching device to perform matching between the value of the information that is of the received packet and needs to be matched and the first field of each record in the database, to obtain a first one of the multiple first records, and the packet processing instruction is used for instructing the switching device to: process the packet according to the packet processing instruction by using the second field of the first one of the first records as the parameter.

11. The device according to claim 8, wherein when multiple first records exist in the database, the match field is used for instructing the switching device to perform matching between the value of the information that is of the received packet and needs to be matched and the first field of each record in the database, to obtain the multiple first records, and the packet processing instruction is used for instructing the switching device to: separately process multiple packets, which are duplicated by the switching device, according to the packet processing instruction by using the second field of each of the multiple first records as the parameter.

* * * * *